United States Patent
Matsuoka

(10) Patent No.: US 9,574,082 B2
(45) Date of Patent: Feb. 21, 2017

(54) SOFT THERMOPLASTIC RESIN COMPOSITION

(71) Applicant: KANEKA CORPORATION, Osaka-shi (JP)

(72) Inventor: Yoshiaki Matsuoka, Takasago (JP)

(73) Assignee: KANEKA CORPORATION, Osaka-shi (JP)

( * ) Notice: Subject to any disclaimer, the term of this patent is extended or adjusted under 35 U.S.C. 154(b) by 0 days.

(21) Appl. No.: 14/910,162

(22) PCT Filed: Aug. 6, 2014

(86) PCT No.: PCT/JP2014/070773
§ 371 (c)(1),
(2) Date: Feb. 4, 2016

(87) PCT Pub. No.: WO2015/020104
PCT Pub. Date: Feb. 12, 2015

(65) Prior Publication Data
US 2016/0177087 A1    Jun. 23, 2016

(30) Foreign Application Priority Data
Aug. 6, 2013  (JP) .................. 2013-163574

(51) Int. Cl.
| | | |
|---|---|---|
| C08L 67/04 | (2006.01) | |
| C08L 25/12 | (2006.01) | |
| C08L 27/06 | (2006.01) | |
| C08J 5/18 | (2006.01) | |
| C08J 5/00 | (2006.01) | |

(52) U.S. Cl.
CPC ...... *C08L 67/04* (2013.01); *C08J 5/00* (2013.01); *C08J 5/18* (2013.01); *C08L 27/06* (2013.01); *C08J 2327/06* (2013.01); *C08J 2367/04* (2013.01); *C08J 2427/06* (2013.01); *C08J 2433/00* (2013.01); *C08J 2467/04* (2013.01); *C08L 2205/03* (2013.01)

(58) Field of Classification Search
CPC ........... C08L 25/12; C08L 27/06; C08L 33/08; C08L 33/10; C08L 67/04; C08J 2327/06
USPC ....................................................... 525/190
See application file for complete search history.

(56) References Cited

U.S. PATENT DOCUMENTS

| | | | |
|---|---|---|---|
| 4,393,167 A | | 7/1983 | Holmes et al. |
| 5,360,853 A | * | 11/1994 | Nagata .............. C08L 27/06 524/269 |

FOREIGN PATENT DOCUMENTS

| | | |
|---|---|---|
| JP | 48-751 | 1/1973 |
| JP | 57-111349 A | 7/1982 |
| JP | 57-167338 A | 10/1982 |
| JP | 8-503723 A | 4/1996 |
| JP | 2008-144095 A | 6/2008 |
| JP | 2009-144090 A | 7/2009 |

OTHER PUBLICATIONS

Machine translation of JP 2008-144095A, published Jun. 2008.*
Gould, et al, "Methyl Methacrylate Copolymers as Processing Aids for Rigid PVC," Kunststoffe 69(7):393-6, 1979 (Translation from German).*
International Search Report Issued Nov. 18, 2014 in PCT/JP14/070773 Filed Aug. 6, 2014.

* cited by examiner

*Primary Examiner* — Fred M Teskin
(74) *Attorney, Agent, or Firm* — Oblon, McClelland, Maier & Neustadt, L.L.P.

(57) ABSTRACT

A soft thermoplastic resin composition comprising:
100 parts by weight of a resin component (A) containing 15 to 65 parts by weight of a vinyl chloride resin having a degree of polymerization of 2000 or less, and 35 to 85 parts by weight of a polyhydroxyalkanoate; and 0.1 to 8 parts by weight of a resin component (B) which is one or more resins selected from the group consisting of a (meth)acrylate resin and an acrylonitrile-styrene resin, and has a weight average molecular weight, in terms of the polystyrene, of 400,000 or more.

6 Claims, No Drawings

SOFT THERMOPLASTIC RESIN COMPOSITION

TECHNICAL FILED

The present invention relates to a soft thermoplastic resin composition, which is alloy mainly containing a vinyl chloride resin and a polyhydroxyalkanoate.

BACKGROUND ART

In order to protect the global environment, low environmental load materials have been received attention, which have a low dependence on fossil fuels which are exhaustible resources and generate large amounts of carbon dioxide and air pollutants. Many low environmental load materials are known, and typical examples thereof may include polylactic acid, polyhydroxyalkanoates, polyamide 11, and the like. The vinyl chloride resin is also a low environmental load material, because 57% thereof is derived from a salt and it has a low dependence on fossil fuels; it has excellent mechanical properties and durability; and the hardness can be widely adjusted to ranges from hard to soft by addition of a plasticizer. The vinyl chloride resin, accordingly, have recently received attention again.

A soft vinyl chloride resin has the excellent mechanical properties and durability, but has a problem in which a large amount of a plasticizer is added. The plasticizer has not only defects of physical properties such as high plasticizer migration, bleeding out property, and volatility but also a defect in which a material suspected of being an environmental hormone is used as the plasticizer, and thus recently the improvement, thereof has been advanced.

For example, polyester plasticizers whose molecular weight is increased to about several thousands to the first half of about several tens of thousands, classified into an oligomer, are known, although usually used plasticizers have a molecular weight of about several hundreds. The plasticizers above, however, cannot sufficiently reduce the plasticizer migration, the bleeding out property, and the volatility, and many of them have a problem in which they are derived from fossil fuels.

Patent Document 1 suggests a resin composition containing a polyhydroxyalkanoate oligomer and a vinyl chloride resin, but it has no Examples in which the vinyl chloride resin is used, and sufficient tensile elasticity and tensile elongation cannot be obtained in other Examples. In addition, polyhydroxyalkanoate oligomers having a molecular weight of 25000 or less are mainly used, and such oligomers have problems of the comparatively high plasticizer migration, bleeding-out property, and volatility, as with the polyester plasticizer, because of the comparatively small molecular weight of the oligomer.

On the other hand, Patent Document 2 is an example in which excellent compatibility with the vinyl chloride resin is realized while the molecular weight is as high as a resin, i.e., from the latter half of several tens of thousands to several hundreds of thousands; which discloses a copolyester polymer containing long chain ester units derived from a long chain glycol having a molecular weight of 600 to 6000 and a dicarboxylic acid having a molecular weight of less than 300, and short chain ester units derived from a diol having a molecular weight of less than 250 and a dicarboxylic acid having a molecular weight of less than 300.

The copolyester polymer described above has a sufficient high molecular weight, and thus has the low plasticizer migration, bleeding out property, and volatility, but its starting materials are derived from fossil fuels, and further improvements are required. In addition, Patent Document 2 has neither description of transparency nor uses which require the transparency at all, and thus it can be considered that the transparency of the copolyester polymer may be insufficient.

On the other hand, Patent Document 3 discloses a resin composition containing a vinyl chloride resin, a polyester resin, and an acrylic polymer. Patent Document 3 is a technique directed to a fiber having increased heat-resistance by improving a thermal shrinkage upon a secondary processing, and a melting paint of the polyester resin is set so that it can impart the excellent heat-resistance in a forming temperature range of the vinyl chloride resin, whereby the comparatively better heat-resistance at the melting point can be realized after the molding. However, the polyester resins actually used in Patent Document 3, such as a polylactic acid resin and a crystalline polyester resin, are not suitable for softening the vinyl chloride resin.

CITATION LIST

Patent Literatures

Patent Document 1: JP-T No. H08-503723
Patent Document 2: JP-A No. S48-751
Patent Document 3: JP-A No, 2008-144095

SUMMARY OF INVENTION

Technical Problem

The present invention, aims at providing a soft thermoplastic resin composition, which is a low environmental load material having a low dependence on fossil fuels capable of easily generating carbon dioxide and air pollutants, in order to protect the global environment; which contains no plasticizer suspected of being an environmental hormone, as with a soft vinyl chloride resin; which has a reduced plasticizer migration, while it has the mechanical properties as good as those of the soft vinyl chloride resin; and which has an excellent mold-processability.

Solution to Problem

In order to solve the problems described above; the present inventors have repeated a painstaking study. As a result, they have found when a polyhydroxyalkanoate, a specific (meth)acrylate resin, and an acrylonitrile-styrene resin are melt-mixed with a specific vinyl chloride resin in a specific ratio to alloy them, a desired soft thermoplastic resin composition can be obtained; and have, completed the present invention.

The present invention, accordingly, provides soft thermoplastic resin compositions 1) to 7), a molded article 8), and a film or a sheet 9).

1) A soft thermoplastic resin composition containing:
100 parts by weight of a resin component (A) containing 15 to 65 parts by weight of a vinyl chloride resin having a degree of polymerization of 2000 or less, and 35 to 85 parts by weight of a polyhydroxyalkanoate; and 0.1 to 8 parts by weight of a resin component (B) which is one or more resins selected from the group consisting of (meth)acrylate resins and acrylonitrile-styrene resins having a weight average molecular weight, in terms of the polystyrene, of 400,000 or more.

The soft thermoplastic resin composition 1) above, accordingly, contains 15 to 65 parts by weight of a vinyl chloride resin having a degree of polymerization of 2000 or less, and 35 to 85 parts by weight of a polyhydroxyalkanoate, the total amount thereof being 100 parts by weight, and 0.1 to 8 parts by weight, based on the total amount of 100 parts, of one or more resins selected from the group consisting of a (meth)acrylate resin and an acrylonitrile-styrene resin, and has a weight average molecular weight, in terms of the polystyrene, of 400,000 or more.

2) The soft thermoplastic resin composition according to 1) above, wherein the polyhydroxyalkanoate is a copolymer formed of monomer units derived from two or more kinds of hydroxyalkanoates.

3) The soft thermoplastic resin composition according to 2) above, wherein the copolymer contains monomer units derived from 3-hydroxybutyrate and monomer units derived from hydroxyalkanoate other than 3-hydroxybutyrate. Here, the monomer unit derived from 3-hydroxybutyrate is a bivalent group in which a hydrogen atom is removed from a hydroxyl group in the 3-hydroxybutyrate and a hydroxyl group is removed from a carboxyl group in the 3-hydroxybutyrate. Similarly, the monomer unit derived from hydroxyalkanoate is a bivalent group in which a hydrogen atom is removed from a hydroxyl group in the hydroxyalkanoate and a hydroxyl group is removed from a carboxyl group in the hydroxyalkanoate.

4) The soft thermoplastic resin composition according to 3) above, wherein the hydroxyalkanoate other than 3-hydroxybutyrate is at least one member selected from the group consisting of 4-hydroxybutyrate, 3-hydroxyvalerate, 3-hydroxyhexanoate, 3-hydroxyoctanoate, and 3-hydroxydecanoate.

5) The soft thermoplastic resin composition according to 3) or 4) above, wherein the copolymer contains 50 to 95% by mole of monomer units derived from the 3-hydroxybutyrate.

6) The soft thermoplastic resin composition according to any one of 1) to 5) above, wherein the resin component (B) has a number average primary particle size of 40 µm or less.

7) The soft thermoplastic resin composition according to any one of 1) to 6) above, wherein a molded article therefrom having a thickness of 1 mm has an HAZE of 50% or less.

8) A molded article comprising the soft thermoplastic resin composition according to any one of 1) to 7).

9) A sheet or film comprising the molded article according to 8) above.

Advantageous Effects of Invention

The soft thermoplastic resin composition of the present invention is a low environmental load material containing fossil fuels in a low ratio, and has a softness and mechanical properties, which are almost the same as those of a soft vinyl chloride resin, even if a plasticizer is not used, and, at the same time, has a reduced plasticizer migration, an excellent mold-processability, and a high transparency.

DESCRIPTION OF EMBODIMENTS

<Soft Thermoplastic Resin Composition>

The soft thermoplastic resin composition of the present invention (which hereinafter may sometimes be referred to simply as "resin composition of the invention") contains a resin component (A) containing a vinyl chloride resin and a polyhydroxyalkanoate, and a resin component (B) which is at least one resin selected from the group consisting of (meth)acrylate resins and acrylonitrile-styrene resins having a weight average molecular weight, in terms of the polystyrene, of 400,000 or more.

The present invention is characterized by softening the hard vinyl chloride resin by using the polyhydroxyalkanoate, not using a large amount of a plasticizer. The compatibility between the vinyl chloride resin and the polyhydroxyalkanoate is excellent, and thus the vinyl chloride resin can be efficiently softened, and a soft thermoplastic resin composition having an excellent transparency can be obtained.

The addition of the (meth)acrylate resin and the acrylonitrile-styrene resin not only promotes the gelation of the vinyl chloride resin and solves problem such as air marks and flow marks, which are molding failures conflict with each other, in a well-balanced way particularly in calendar molding, but also imparts flexibility to the molten resin composition of the invention, whereby releasability from a calendar roll can be improved.

As the major premise, about 60% of all vinyl chloride resins usually used are derived from salt, i.e., non-fossil fuels. In addition, polyhydroxyalkanoate is also completely derived from a non-fossil fuel. The resin composition of the invention, which mainly contains the components above, has the high dependence of the non-fossil fuel, and thus it can be said that the composition of the invention is the low environmental load material.

From the above, the soft thermoplastic resin composition having the low environmental load, low plasticizer migration, excellent softness, excellent mold-processability, and excellent transparency is obtained.

In the present invention, "the composition is soft" means that the composition has a tensile elasticity of 1000 MPa or less and a tensile elongation of 100% or more. The resin composition of the invention is soft like a rubber, and thus the tensile test thereof should be compliant with JIS K 6251 "Rubber, vulcanized or thermoplastics—Determination of tensile stress-strain properties," and it is preferable to use a No. 2 dumbbell as a test sample and to set a test speed at 500 mm/minute. The thickness of the test sample is not particularly limited, and a thickness of 1 mm is recommended, because there are only a few variations and the measurement can be extremely precisely performed.

In the resin composition of the invention, it is preferable that a molded article therefrom having a thickness of 1 mm has an HAZE of 50% or less. When the HAZE is more than 50%, the transparency and colorability are deteriorated, and thus the application thereof may possibly be limited. In order to expand its application, the molded article has an HAZE of preferably 40% or less, more preferably 30% or less, even more preferably 20% or less, particularly preferably 10% or less.

The resin composition of the invention can be applied to various applications including applications for the product in which soft vinyl chloride resin is used, such as building materials, wire-coating materials, generally used films and sheets, coatings, adhesives, and pigments, agricultural plastic sheets, leather, extruded products (hoses and gaskets), footwear, and compound sols, because of its excellent softness, mold-processability, and transparency.

Application examples of the building material may include interior materials such as wallpaper and flooring materials, water sealing materials such as waterproof sheets for civil engineering and construction works, and roofing sheets, tarpaulin, canvas, tents, air domes, flexible containers, curing sheets, track sheets, and the like.

Application examples of the wire-coating material may include wire harnesses, power cords for tools, CV cables, unit cables for indoor wiring, flat cables, and the like.

Application examples of the generally used films and sheets may include printing materials, wrapping applications for clothing products, groceries, convenience goods, and stationeries, binding applications for publications and magazines, covers for electric appliances and machines, commodities such as raincoats, umbrellas, and shopping bags, play equipment such as swimming rings and beach balls, nursing goods such as marking films, Airpoline, and Rainbow Tunnel, health and fitness products such as yoga mats, and the like.

Application examples of the leather may include furniture such as sofas and chairs, interior articles such as fancy cases, table clothes, table covers, and accordion curtains, interior materials for automobiles, fashion goods such as belts, bags, and suitcases, and the like.

Application examples of the extruded product (hose and gasket) may include garden hoses, gaskets for a refrigerator, flexible hoses for a washing machine and a cleaner, specific hoses for industrial use which are reinforced by an elastic spiral bellows hose or spring as a core, sealing materials (packing) utilized in a sliding window frame, sealing materials for an automobile window, and the like.

Application examples of the footwear may include footwear made from a synthetic material, sandals, slippers, Japanese sandals, rubber boots, injection boots, core materials for sandals, and the like.

Application examples of the coatings, adhesives, and pigments may include coating film-forming aid for an emulsion coating, flexibility improving agent, adhesives for plywood in a corrugated carton or furniture, additives such as toner, and the like. In addition, the application examples thereof may include medical applications, including blood bags, tubes, and the like.

The resin composition of the invention has an extensive moldability, which can be molded in various molding methods, and thus molded articles having various shapes or states can be obtained therefrom. In particular, the composition is suitably molded in a calendar molding, and thus is preferable for a sheet or film application. In addition, it has characteristics of the remarkably reduced plasticizer migration and of a small tack feeling because of no use of a plasticizer, and thus it can be preferably used for printing materials such as a marking film. In addition, the molded articles obtained therefrom have an excellent texture of an outside appearance, and high-grade sensation, and thus it can be preferably used for fashion articles such as leather in expensive furniture, belts, bags, and suitcases.

Hereinafter, the resin component (A) and the resin component (B) in the resin composition of the invention are explained in more detailed below.

<Resin Component (A)>

The resin component (A) contains a vinyl chloride resin having a degree of polymerization of 2000 or less and a polyhydroxyalkanoate, preferably consists of the vinyl chloride resin having a degree of polymerization of 2000 or less and the polyhydroxyalkanoate.

As the vinyl chloride resin, any known vinyl chloride resin having a degree of polymerization of 2000 or less may be used without any limitation, and it is possible to preferably use polymers containing 60% by weight to 100% by weight of a vinyl chloride monomer derived from at least one monomer compound selected from the group consisting of vinyl chloride and vinyl chloride derivatives, and 0 to 40% by weight of a monomer copolymerizable with the vinyl chloride monomer (which is hereinafter referred to as "arbitrary monomer (1)"), the total amount thereof being 100% by weight. When the content of the vinyl chloride monomer is less than 60% by weight or the content of the arbitrary monomer (1) is more than 40% by weight, the compatibility, the mechanical properties, and the like, which are original properties of the vinyl chloride resin, may sometimes be lost.

In terms of the same viewpoint as above, i.e., the improvement of the compatibility, the mechanical properties, and the like, the vinyl chloride resin used in the present invention is preferably a polymer containing 75% by weight to 100% by weight of the vinyl chloride monomer and 0 to 25% by weight of the arbitrary monomer (1), more preferably a polymer containing 85% by weight to 100% by weight of the vinyl chloride monomer and 0 to 15% by weight of the arbitrary monomer (1).

The vinyl chloride derivative is preferably a compound having a structure in which 1, 2, or 3 hydrogen atoms in the vinyl chloride are substituted by chlorine atoms, more preferably a compound having a structure in which 1 or 2 hydrogen atoms in the vinyl chloride are substituted by chlorine atoms, and even more preferably, a compound having a structure in which one hydrogen atom in the vinyl chloride is substituted by a chlorine atom. It becomes difficult to advance the gelation as the number of hydrogen atoms in the vinyl chloride substituted by the chlorine atoms is increased, and the mold-processing may not sometimes be performed. Even if the gelation can be performed, the melt-viscosity of the resulting product is too high to obtain the molded article having the desired shape, or the molding failures such as flow marks may sometimes be generated.

Any known substance may be used as the arbitrary monomer (1), and it is preferable to use, for example, one or more compounds selected from the group consisting of (meth)acrylates, vinyl arenes, vinylcarboxylic acids, vinyl cyanides, vinyl halides excluding vinyl chloride, vinyl acetate, alkenes, and alkynes.

The (meth)acrylates may include, for example, methacrylate having an alkyl group with 1 to 22 carbon atoms, such as methyl methacrylate, ethyl methacrylate, propyl methacrylate, butyl methacrylate, 2-ethylhexyl methacrylate, octyl methacrylate, dodecyl methacrylate, stearyl methacrylate, and behenyl methacrylate; acrylates having an alkyl group with 1 to 22 carbon atoms and a hydroxyl group, such as 2-hydroxyethyl acrylate and 4-hydroxybutyl acrylate; (meth)acrylates having an epoxy group such as glycidyl (meth)acrylate; (meth)acrylates having an alkyl group with 1 to 22 carbon atoms and an alkoxy group, and the like. The number of carbon atoms of the alkyl group in the (meth)acrylate is not necessarily limited; however, for example, if the number of carbon atoms is more than 22, the polymerizablity may sometimes be deteriorated, and thus it is possible to preferably use the (meth)acrylates having an alkyl group with 22 or less carbon atoms. In order to further improve the polymerizablility; (meth)acrylates having an alkyl group with 12 or less carbon atoms are more preferable, and (meth)acrylates having an alkyl group with 8 or less carbon atoms are even more preferable, because they have the excellent compatibility with the polyhydroxyalkanoate.

The vinyl arenes may include styrene, α-methyl styrene, monochlorostyrene, dichlorostyrene, and the like. The vinylcarboxylic acids may include acrylic acid, methacrylic acid, itaconic acid, and the like. The vinyl cyanides may include acrylonitrile, methacrylonitrile, and the like. The vinyl halides excluding vinyl chloride may include vinyl bromide, vinyl fluoride, and the like. The alkenes may include ethylene, propylene, butene, butadiene, isobutene, and the like. The alkynes may include acetylene and the like.

Of the arbitrary monomers (1) described above, at least one monomer selected from the group consisting of the alkyl (meth)acrylates, vinyl acetate, and alkenes is more preferable, in terms of the reactivity and softening; one or more monomers selected from the group consisting of the alkyl acrylate, vinyl acetate, and ethylene are even more preferable; and vinyl acetate is particularly preferable in terms of the reactivity, softening, versatility, and polymerizability. The vinyl chloride monomers or the arbitrary monomers (1) in the vinyl chloride resin may be used alone or as a mixture of two or more kinds.

The vinyl chloride resin, has a degree of polymerization of 2000 or less, whereby the good mold-processability can be imparted to, for example, the vinyl chloride resin and, eventually, the resin composition of the invention. When the degree of polymerization is more than 2000, the vinyl chloride resin is insufficiently melted and gelled, and thus it may be difficult to mold it. Even if the vinyl chloride resin can be melted and kneaded, the melt-viscosity is too high to obtain the molded article having the desired shape, or the molding failures such as flow marks may sometimes be generated.

Although the resin composition of the invention can contain the plasticizer in a range in which a plasticizer migration is not so high, as described below, when the composition does not contain the plasticizer or contains the plasticizer in an amount of 5 parts by weight or less based on 100 parts by weight of the resin component (A), the vinyl chloride resin has preferably a degree of polymerization of 1400 or less in terms of the easy molding, more preferably 1100 or less, even more preferably 900 or less because even if the composition does not contain the plasticizer, the molded article having the excellent transparency can be obtained.

When the plasticizer is added in an amount of more than 5 parts by weight, the sufficient processability and transparency can be expressed even if the degree of polymerization is higher, and the degree of polymerization of the vinyl chloride resin is preferably from 800 to 1700, more preferably from 950 to 1400 because the excellent mechanical properties and the excellent mold-processability of vinyl chloride resin can be well-balanced.

In the resin composition of the invention, the vinyl chloride resin is softened by the polyhydroxyalkanoate, and thus the vinyl chloride resin in the present invention has a glass transition temperature of preferably 130° C. or lower, more preferably 110° C. or lower, even more preferably 90° C. or lower, particularly preferably 80° C. or lower. When the glass transition temperature is higher than 130° C. the vinyl chloride resin cannot be sufficiently softened by the polyhydroxyalkanoate alone and a large amount of plasticizer is necessary in addition to the polyhydroxyalkanoate, and thus the softening and the low plasticizer migration may not sometimes be attained in a well-balanced way in the resin composition of the invention.

The glass transition temperature (which hereinafter may sometimes be referred to as "Tg") of the vinyl chloride resin can be measured, for example, by a differential scanning calorie analysis or a dynamic viscoelasticity measurement, but in the present invention the glass transition temperature is a value calculated from a Fox formula using values described in Polymer Hand Book (J. Brandrup, Interscience 1989). For example, 84° C. is used for the polyvinyl chloride Polyvinyl acetate has a Tg of 32° C.

When Tg is measured according to the differential scanning calorie analysis or the dynamic viscoelasticity measurement, as for at least the vinyl chloride resin, and a (meth)acrylate resin and an acrylonitrile-styrene resin described below, it is necessary to optimize measurement conditions so as to obtain values described in Polymer Hand Book, because the Tg varies depending on the shape of a test sample to be measured, the temperature-rising rate, and the like.

The vinyl chloride resin can be produced in a known method. Examples thereof may include an emulsion polymerization, a microsuspension polymerization, a suspension polymerization, a solution polymerization, a bulk polymerization, and the like. The emulsion polymerization, the microsuspension polymerization, and the suspension polymerization are more preferable, because a powdery product characteristic, which can be easily handled, can be obtained, and the suspension polymerization is particularly preferable in terms of the versatility, in particular.

In the present invention, the vinyl chloride resin, obtained by the polymerization, may be further modified. Typical example of the modification after the polymerization in the present invention may include "chlorination."

Of the vinyl chloride resins having a degree of polymerization of 2000 or less, homopolymers of vinyl chloride and copolymers of vinyl chloride and vinyl acetate are preferable. Of the homopolymers, homopolymers having a degree of polymerization of 700 to 1500 are preferable, and homopolymers having a degree of polymerization of 750 to 1400 are more preferable. Of the copolymers, copolymers having a vinyl acetate content of 5 to 15% by weight of the copolymer and copolymers having a degree of polymerization of 500 to 800 are preferable, and copolymers having a vinyl acetate content of 5 to 15% by weight of the copolymer and a degree of polymerization of 500 to 800 are more preferable.

The polyhydroxyalkanoate, used together with the vinyl chloride resin in the resin component (A), is a polymer having monomer units derived from the hydroxyalkanoate (bivalent groups in which the hydrogen atom is removed from the hydroxyl group in the hydroxyalkanoate and the hydroxyl group is removed from the carboxyl group in the hydroxyalkanoate). The monomer units may include monomer units represented by the formula: [—CH(R)—CH$_2$CO—O—] wherein R is an alkyl group represented by —C$_n$H$_{2n+1}$, and n is an integer of 1 to 24; monomer units represented by the formula: [—CH(R')—CH$_2$—CH$_2$CO—O—] wherein R' is H or an alkyl group represented by —C$_n$H$_{2n+1}$, and n is an integer of 1 to 24, and the like. The monomer units may be used as alone or as a mixture of two or more kinds. The homopolymer formed of only one kind can be exemplified by poly(3-hydroxybutyrate), and the like. In the homopolymers, however, the degree of crystallinity is excessively increased and the crystallization speed becomes too fast, and thus crystals may sometimes be partly formed in the molded article. When the crystals are formed in the molded article, there are parts whose refractive index is different from those of other parts; as a result, the softness and the transparency of the molded article may sometimes be deteriorated. For that reason, as the polyhydroxyalkanoate, copolymers formed of two or more kinds of monomer units are preferable. As the polyhydroxyalkanoate, copolymers of monomer units derived from 3-hydroxybutyrate and monomer units derived from hydroxyalkanoate other than the above are more preferable, from the viewpoints of the easy availability of the starting materials, versatility, and the productivity of the polymer.

The hydroxyalkanoate other than 3-hydroxybutyrate is not particularly limited, and specific examples thereof may include 4-hydroxybutyrate, 3-hydroxyvalerate, 3-hydroxyhexanoate, 3-hydroxyoctanoate, 3-hydroxydecanoate, and the like, in terms of the softness, the transparency, and the like of the resin composition of the invention.

Specific examples of the copolymer of 3-hydroxybutyrate and the other hydroxyalkanoate may include poly[(3-hydroxybutyrate)-co-(4-hydroxybutyrate)], poly[(3-hydroxybutyrate)-co-(3-hydroxyvalerate)], poly[(3-hydroxybutyrate)-co-(3-hydroxyhexanoate)], poly[(3-hydroxybutyrate)-co-(3-hydroxyoctanoate)], poly[(3-hydroxybutyrate)-co-(3-hydroxydecanoate)], and the like. Of these polymers, the poly[(3-hydroxybutyrate)-co-(4-hydroxybutyrate)], and poly[(3-hydroxybutyrate)-co-(3-hydroxyhexanoate)] are preferable, because the softness can be easily imparted to the resin composition of the invention; and the poly[(3-hydroxybutyrate)-co-(3-hydroxyhexanoate)] is particularly preferable in terms of the softness and the transparency of the resin composition of the invention.

In the copolymer described above, a copolymerization composition ratio of the monomer units derived from 3-hydroxybutyrate to the monomer units derived from hydroxyalkanoate other than the above (monomer units derived from 3-hydroxybutyrate/monomer units derived from hydroxyalkanoate other than the above) is not particularly limited, and it is preferably from 50 to 95% by mole/5 to 50% by mole, more preferably from 60 to 92% by mole/8 to 40% by mole, even more preferably from 70 to 90% by mole/10 to 30% by mole, because the transparency and the softness of the resin composition of the invention can be further increased.

In the poly[(3-hydroxybutyrate)-co-(3-hydroxyhexanoate)], copolymers are particularly preferable which have a ratio of the monomer units derived from 3-hydroxybutyrate of 70 to 95% by mole of the copolymer, preferably from 70 to 90% by mole, and a weight average molecular weight of 450.000 to 600,000, preferably 500,000 to 550,000. In the poly[(3-hydroxybutyrate)-co-(4-hydroxybutyrate)], copolymers are particularly preferable which have a ratio of the monomer units derived from 3-hydroxybutyrate of 70 to 95% by mole of the copolymer, preferably 75 to 95% by mole, and a weight average molecular weight of 650,000 to 1,150,000, preferably 700,000 to 1,050,000.

The polymerization method to obtain the copolymer described above is not particularly limited, and any copolymerization method of a random copolymerization, an alternating copolymerization, a block copolymerization, and the like may be applied. The random copolymerization s preferable, because the degree of crystallinity of the obtained copolymer is reduced, the crystallization speed is decreased, and the transparency is improved. The production method is not particularly limited, and it is preferable to produce using microorganisms.

The molecular weight of the polyhydroxyalkanoate is not particularly limited, and it is preferably from 10,000 to 3,000,000, more preferably from 30,000 to 2,000,000, even more preferably from 50,000 to 1,500,000, particularly preferably from 100,000 to 1,000,000, in terms of the impact resistance, the tensile properties, and the mold-processability of the resin composition of the invention. When the polyhydroxyalkanoate has a weight average molecular weight of less than 10,000, the polyhydroxyalkanoate belongs to a class called an oligomer, and it sometimes may not be possible to suppress the plasticizer migration to a low level. In addition, the mechanical properties such as the strength of the resin composition of the invention may sometimes be insufficient. On the other hand, when the weight average molecular weight is more than 3,000,000, the mold-processability of the resin composition of the invention may sometimes be reduced.

A method of measuring the weight average molecular weight of the polyhydroxyalkanoate is not, particularly limited, and measurement methods utilizing a gel permeation chromatography (GPC) are preferable. One example of the measurement methods is exemplified by a method in which chloroform is used as a mobile phase, a GPC system, manufactured by Waters Corporation is used as a system, and Shodex K-804 (trade name, a polystyrene gel), manufactured by Showa Denko K. K., is used as a column filler. The weight average molecular weight can be obtained according to the method in terms of the polystyrene.

A ratio of the vinyl chloride resin and the polyhydroxyalkanoate in the resin component (A) is that the vinyl chloride resin is from 0.15 to 65 parts by weight and the polyhydroxyalkanoate is from 35 to 85 parts by weight, the total amount thereof being 100 parts by weight.

When the amount of the vinyl chloride resin is less than 15 parts by weight or the amount of the polyhydroxyalkanoate is more than 85 parts by weight, or when the amount of the vinyl chloride resin is more than 65 parts by weight or the amount of the polyhydroxyalkanoate is less than 35 parts by weight, a non-soft resin composition sometimes may be obtained, for example, the softness is insufficient, the tensile elongation does not reach 100%. The non-soft resin composition can be used in hard applications, and the hard application may include, for example, building materials such as window frames, sidings, decks, and the like.

A blending ratio of the vinyl chloride resin and the polyhydroxyalkanoate is preferably a ratio of 25 to 65 parts by weight of the vinyl chloride resin and 35 to 75 parts by weight of the polyhydroxyalkanoate, more preferably a ratio of 35 to 65 parts by weight of the vinyl chloride resin and 35 to 65 parts by weight of the polyhydroxyalkanoate because the excellent transparency can be obtained; even more preferably a ratio of 35 to 60 parts by weight of the vinyl chloride resin and 40 to 65 parts by weight of the polyhydroxyalkanoate because the excellent softness can be obtained; still even more preferably a ratio of 40 to 60 parts by weight of the vinyl chloride resin and 40 to 60 parts by weight of the polyhydroxyalkanoate, particularly preferably a ratio of 40 to 55 parts by weight of the vinyl chloride resin and 45 to 60 parts by weight of the polyhydroxyalkanoate because the resin composition of the invention having the transparency, the softness, the mold-processability, the plasticizer migration, and the like in a well-balanced way at a high level can be obtained.

A more preferable combination of the vinyl chloride resin and the polyhydroxyalkanoate is exemplified by a combination of at least one member selected from the group consisting of "vinyl chloride homopolymers having a degree of polymerization of 2000 or less, 700 to 1500, or 750 to 1400" and "vinyl chloride copolymer containing vinyl chloride and vinyl acetate, having a vinyl acetate content of 5 to 15% by weight of the copolymer, and having a degree of polymerization of 500 to 800"; and at least one member selected from the group consisting of "poly[(3-hydroxybutyrate)-co-(3-hydroxyhexanoate)] having a 3-hydroxybutyrate content of 70 to 95% by mole, or 70 to 90% by mole of the copolymer, and a weight average molecular weight of 450,000 to 600,000, or 500,000 to 550,000" and "poly[(3-hydroxybutyrate)-co-(4-hydroxybutyrate)] having a 3-hydroxybutyrate content of 70 to 95% by mole, or 75 to 95% by mole of the copolymer, and a weight average molecular weight of 650,000 to 1150,000 or 700,000 to 1050,000."

<Resin Component (B)>

In the resin composition of the invention, as the resin component (B), one or more resins selected from the group consisting of (meth)acrylate resins and acrylonitrile-styrene resins, which have a weight average molecular weight, in terms of the polystyrene, of 400,000 or more, are used. In the present invention, the (meth)acrylate resin refers to both or either of a methacrylate resin and an acrylate resin, unless otherwise noted.

The (meth)acrylate resin used in the present invention is not particularly limited, so long as it has a weight average molecular weight, in terms of the polystyrene, of 400,000 or more. Homopolymers and copolymers containing (30 to 100% by weight of a (meth)acrylate monomer and 0 to 40% by weight of a monomer copolymerizable with the (meth) acrylate monomer (hereinafter referred to as "arbitrary monomer (2)"), the total content thereof being 100% by weight, are preferable. When the amount of the (meth) acrylate monomer is less than 60% by weight, the compatibility with the resin component (A) is reduced, and the mechanical properties and the transparency may sometimes be insufficient.

The ratio of the (meth)acrylate monomer and the arbitrary monomer (2) is preferably a ratio of 70 to 100% by weight of the (meth)acrylate monomer and 0 to 30% by weight of the arbitrary monomer (2), more preferably a ratio of 80 to 100% by weight of the (meth)acrylate monomer and 0 to 20% by weight of the arbitrary monomer (2), even more preferably a ratio of 90 to 100% by weight of the (meth) acrylate monomer and 0 to 10% by weight of the arbitrary monomer (2).

The (meth)acrylate monomer may include, for example, methacrylates having an alkyl group with 1 to 22 carbon atoms such as methyl methacrylate, ethyl methacrylate, propyl methacrylate, butyl methacrylate, 2-ethylhexyl methacrylate, octyl methacrylate, dodecyl methacrylate, stearyl methacrylate, and behenyl methacrylate; acrylates having an alkyl group with 1 to 22 carbon atoms and a hydroxyl group such as 2-hydroxyethyl acrylate and 4-hydroxybutyl acrylate; (meth)acrylates having an epoxy group such as glycidyl (meth)acrylate; and (meth)acrylates having an alkyl group with 1 to 22 carbon atoms and an alkoxy group. The number of carbon atoms of the alkyl group in the (meth)acrylate is not necessarily limited, but, for example, if the number of carbon atoms is more than 22, the polymerizability may sometimes be deteriorated, and thus it is possible to preferably use the (meth)acrylates having an alkyl group with 22 or less carbon atoms. The (meth)acrylates having an alkyl group with 1 to 12 carbon atoms are more preferable, and the (meth)acrylates having an alkyl group with 1 to 8 carbon atoms are even more preferable because they have the excellent compatibility with the polyhydroxyalkanoate.

Known compounds can be used as the arbitrary monomer (2), and it is preferable to use, for example, one or more compounds selected from the group consisting of vinyl arenes, vinylcarboxylic acids, vinyl cyanides, vinyl halides excluding vinyl chloride, vinyl acetate, alkenes, and alkynes.

The vinyl arenes may include styrene, α-methyl styrene, monochlorostyrene, dichlorostyrene, and the like. The vinylcarboxylic acids may include acrylic acid, methacrylic acid, itaconic acid, and the like. The vinyl cyanides may include acrylonitrile, methacrylonitrile, and the like. The vinyl halides excluding vinyl chloride may include vinyl bromide, vinyl fluoride, and the like. The alkenes may include ethylene, propylene, butene, butadiene, isobutene, and the like. The alkynes may include acetylene and the like. Of the arbitrary monomers (2), acrylonitrile and styrene are preferable in terms of the compatibility with another resin and the like. The arbitrary monomer (2) may be used alone or as a mixture of two or more kinds.

The acrylonitrile-styrene resin used in the present invention is not particularly limited so long as it has a weight average molecular weight, in terms of the polystyrene, of 400,000 or more. Homopolymers and copolymers which contains 60 to 100% by weight of a vinyl monomer containing acrylonitrile and styrene, and 0 to 40% by weight of a monomer copolymerizable therewith (hereinafter referred to as "arbitrary monomer (3)"), total amount thereof being 100% by weight, are preferable. When the amount of the vinyl monomer is less than 60% by weight, the compatibility with the resin component (A) is reduced, and the mechanical property and the transparency may sometimes be insufficient.

The ratio of the vinyl monomer and the arbitrary monomer (3) is preferably a ratio of 70 to 100% by weight of the vinyl monomer and 0 to 30% by weight of the arbitrary monomer (3), more preferably a ratio of 80 to 100% by weight of the vinyl monomer and 0 to 20% by weight of the arbitrary monomer (3), even more preferably a ratio of 90 to 100% by weight of the vinyl monomer and 0 to 10% by weight of the arbitrary monomer (3).

The ratio of the acrylonitrile and the styrene in the vinyl monomer is, in terms of the compatibility with the resin component (A), preferably a ratio of 5 to 40% by weight of the acrylonitrile and 60 to 95% by weight of the styrene, the total content of the acrylonitrile and the styrene being 100% by weight, more preferably a ratio of 10 to 35% by weight of the acrylonitrile and 65 to 90% by weight of the styrene, even more preferably a ratio of 15 to 30% by weight of the acrylonitrile and 70 to 85% by weight of the styrene, particularly preferably a ratio of 20 to 30% by weight of the acrylonitrile and 70 to 80% by weight of the styrene.

As the arbitrary monomer (3), any known monomer may be used. It is preferable to use, for example, one or more monomers selected from the group consisting of (meth) acrylates, vinyl arenes, vinylcarbolic acids, vinyl halides excluding vinyl chloride, vinyl acetate, alkenes, and alkynes.

The (meth)acrylates may include, for example, methacrylates having an alkyl group with 1 to 22 carbon atoms such as methyl methacrylate, ethyl methacrylate, propyl methacrylate, butyl methacrylate, 2-ethyl hexyl methacrylate, octyl methacrylate, dodecyl methacrylate, stearyl methacrylate, behenyl methacrylate; acrylates having an alkyl group with 1 to 22 carbon atoms and a hydroxyl group such as 2-hydroxyethyl acrylate, and 4-hydroxybutyl acrylate; (meth)acrylates having an epoxy group such as glycidyl (meth)acrylate; (meth)acrylates having an alkyl group with 1 to 22 carbon atoms and an alkoxy group, and the like. The number of carbon atoms of the alkyl group in the (meth) acrylates are not necessarily limited, but, for example, if the number of carbon atoms is more than 22, the polymerizability may sometimes be deteriorated, and thus it is possible to preferably use the (meth)acrylates having an alkyl group with 1 to 22 carbon atoms. In order to more improve the polymerizability, it is more preferable to use (meth)acrylates having an alkyl group with 1 to 12 carbon atoms, and (meth)acrylates having an alkyl group with 1 to 8 carbon atoms are even more preferable, because they have the excellent compatibility with the polyhydroxyalkanoate.

The vinyl arenes may include α-methyl styrene, monochlorostyrene, dichlorostyrene, and the like. The vinylcarboxylic acids may include acrylic acid, methacrylic acid, itaconic acid, and the like. The vinyl halides excluding vinyl chloride may include vinyl bromide, vinyl fluoride, and the like. The alkenes may include ethylene, propylene, butene, butadiene, isobutene, and the like. The alkynes may include acetylene and the like.

Of the arbitrary monomers (3), the (meth)acrylate are preferable in terms of the compatibility with the resin component (A), and methyl methacrylate, butyl methacrylate, ethyl acrylate, and butyl acrylate are more preferable. The arbitrary monomer (3) may be used alone or as a mixture of two or more kinds.

The (meth)acrylate resin and the acrylonitrile-styrene resin have the excellent compatibility, and thus these may be used together, or either one may be used.

The (meth)acrylate resin and the acrylonitrile-styrene resin, which is the resin component (B), have a weight average molecular weight, in ter of the polystyrene, of 400,000 or more, preferably 400,000 or more and 10,000,000 or less.

When the weight average molecular weight, in terms of the polystyrene, is less than 400,000, the vinyl chloride resin cannot gel or the gelation of the vinyl chloride resin is insufficiently advanced, and thus it may sometimes be difficult to mold the resin composition. In addition, even if the resin composition can be molded, sufficient mechanical properties may not be exhibited. When the weight average molecular weight is more than 10,000,000, the resin component (B) remains in the molded article as a non-melted resin, and the molded article may sometimes have a poor appearance. Even if the resin component (B) is melted, a poor appearance such as flow marks may sometimes be left.

The resin component (B) has a weight average molecular weight of preferably 700,000 or more and 6,000,000 or less, more preferably 1,400,000 or more and 4,000,000 or less, in terms of the excellent ability of gelling the vinyl chloride resin, in particular, in terms of the excellent releasability from a calendar roll upon the calendar molding, and the reduced amount of the non-melted resin upon the molding of the resin component (B), thus resulting in the reduced generation of the flow marks. The (meth)acrylate resin and the acrylonitrile-styrene resin, which is the resin component (B), have the excellent compatibility with both the vinyl chloride resin and the polyhydroxyalkanoate, and thus the transparency of the resin composition of the invention is not reduced, or the reduction thereof can be minimized.

A method of measuring the weight average molecular weight of the (meth)acrylate resin or the acrylonitrile-styrene resin is not particularly limited, and measurement methods utilizing a gel permeation chromatography (GPC) are preferable. One example of the measurement methods is exemplified by a method in which tetrahydrofuran is used as a mobile phase, a GPC system, manufactured by Tosoh Corporation (trade name: HLC-8220 GPC) is used as a system, and TSK guardcolumn Super HZ-H and TSK gel Super HZM-H (trade name, a polystyrene gel), manufactured by Tosoh Corporation, are used as a column filler. The weight average molecular weight can be obtained according to the method in terms of the polystyrene. When it is difficult to dissolve the (meth)acrylate resin or the acrylonitrile-styrene resin in tetrahydrofuran, the solvent used as the mobile phase can be appropriately changed.

The (meth)acrylate resin and the acrylonitrile-styrene resin have a number average primary particle size of preferably 40 μm or less, more preferably 1.5 μm or less, even more preferably 5 μm or less, further even more preferably 1 μm or less, particularly preferably 0.5 μm or less. When the number average primary particle size of the methacrylate resin and the acrylonitrile-styrene resin is more than 40 μm, the (meth)acrylate resin and/or the acrylonitrile-styrene resin may not be melted by the composition of the resin composition of the invention or melt-molding process of the present invention, and the non-melted resin remains in the molded article such as a sheet, thus resulting in the poor appearance of the molded article.

The (meth)acrylate resin and the acrylonitrile-styrene resin, used in the present invention, can be produced in a known method such as a bulk polymerization, a melt polymerization, a solution polymerization, suspension polymerization, microsuspension polymerization, a dispersion polymerization, or an emulsion polymerization. Of these polymerization methods of the resins, the suspension polymerization, the microsuspension polymerization, the dispersion polymerization, and the emulsion polymerization are preferable, because resins having a number average primary particle size of 40 μm or less can be easily produced. In order to make the number average primary particle size more preferable, the microsuspension polymerization, the dispersion polymerization, and the emulsion polymerization are more preferable, and the emulsion polymerization is particularly preferable.

The primary particle size used herein refers to a particle size of the minimum unit particle, confirmed when the resin particles are directly observed with an electron microscope, or the like. Even when a part of the primary particles are fused to each other, each physical property of the resin composition of the invention is not affected. Recently, there are unique polymerizations and production methods of fine particles, for example, there are fine particles having a layered structure in which a fine particle having a particle size of 1 μm is coated with a fine particle having a particle size relatively larger than it, such as about 150 μm. In such a case, the former size, 1 μm, is considered as the primary particle size, and the particle size of the larger particles, about 150 μm, is considered as the secondary particle size. In the present invention, the number average primary particle size is obtained by directly measuring particle sizes of 100 or more primary particles using the electron microscope and the like, and averaging the measured values, as described above.

The (meth)acrylate resin and the acrylonitrile-styrene resin used in the present invention have a glass transition temperature Tg of preferably 0 to 140° C., more preferably 30 to 120° C., even more preferably 40 to 110° C., particularly preferably 45 to 95° C. When the glass transition temperature Tg is lower than 0° C., the vinyl chloride resin does not gel, or the gelation of the vinyl chloride resin may sometimes be insufficiently advanced. When the glass transition temperature Tg of the (meth)acrylate resin or the acrylonitrile-styrene resin is higher than 140° C., these resins remain in the molded article, such as a sheet, formed of the resin composition of the invention, as the non-melted resin, and thus the molded article may sometimes have the poor appearance.

The glass transition temperature Tg of the (meth)acrylate resin and the acrylonitrile-styrene resin, used in the present invention, can be measured, for example, by a differential scanning calorie analysis or a dynamic viscoelasticity measurement, but in the present invention the glass transition temperature Tg is a value calculated from a Fox formula using values described in Polymer Hand Book (J. Brandrup, Interscience 1989). For example, Tg of polymethyl methacrylate is 105° C., Tg of polybutyl acrylate is −54° C., and Tg of polymethacrylic acid is 228° C.

When Tg is measured according to the differential scanning calorie analysis or the dynamic viscoelasticity measurement, as for at least three polymers (the vinyl chloride resin, the (meth)acrylate resin, and the acrylonitrile-styrene resin), it is necessary to optimize measurement conditions so as to obtain values described in Polymer Hand Book, because the Tg varies depending on the shape of a test sample to be measured, the temperature-rising rate, and the like.

The blending amount of the resin component (B) in the resin composition of the invention is from 0.1 to 8 parts by weight based on 100 parts by weight of the resin component (A), and it is preferably from 0.5 to 7 parts by weight, more preferably 1 to 5 parts by weight, because both the air marks and the flow marks can be suppressed, and the beautiful molded article having the excellent transparency can be obtained. When the blending amount of the resin component (B) is less than 0.1 parts by weight, unacceptable air marks may sometimes be generated. In addition, the gelation of the vinyl chloride resin cannot be sufficiently advanced, and the mechanical properties, the transparency, and the like may sometimes not be expressed. When the blending amount of the resin component (B) is more than 8 parts by weight, the unacceptable flow marks may sometimes be generated.

In the resin composition of the invention, the combinations of the blending amount of the vinyl chloride resin and the polyhydroxyalkanoate, forming the resin component (A), and the blending amount of the resin component (B) are as follows:

When 15 to 65 parts by weight of the vinyl chloride resin and 35 to 85 parts by weight of the polyhydroxyalkanoate are blended as the resin component (A), the blending amount of the resin component (B) is from 0.1 to 8 parts by weight, from 0.5 to 7 parts by weight, or from 1 to 5 parts by weight. When "25 to 65 parts by weight of the vinyl chloride resin and 35 to 75 parts by weight of the polyhydroxyalkanoate," "35 to 65 parts by weight of the vinyl chloride resin and 35 to 65 parts by weight of the polyhydroxyalkanoate," "35 to 60 parts by weight of the vinyl chloride resin and 40 to 65 parts by weight of the polyhydroxyalkanoate," "40 to 60 parts by weight of the vinyl chloride resin and 40 to 60 parts by weight of the polyhydroxyalkanoate," or "40 to 55 parts by weight of the vinyl chloride resin and 45 to 60 parts by weight of the polyhydroxyalkanoate" are blended as the resin component (A), the blending amount of the resin component (B) is from 0.1 to 8 parts by weight, from 0.5 to 7 parts by weight, or 1 to 5 parts by weight.

<Plasticizer>

In the present invention, the vinyl chloride resin can be sufficiently softened by using the polyhydroxyalkanoate alone, but it is possible, if necessary, to use a plasticizer as an aid within a range in which the plasticizer migration of the resin composition of the invention is not increased, whereby the resin composition is still more softened, and a cold-resistance can be imparted to the resin composition. In order not to increase the plasticizer migration, the blending amount of the plasticizer is preferably 22 parts by weight or less, more preferably 18 parts by weight or less, even more preferably 12 parts by weight or less, further even more preferably 7 parts by weight or less, particularly preferably 3 parts by weight or less, based on 100 parts by weight of the resin component (A).

As the plasticizer, which can be used in the present invention, known plasticizers may be used, it may include, for example, phthalic acid ester plasticizers such as di(n-butyl) phthalate, di(n-octyl) phthalate, di(2-ethylhexyl) phthalate, diisooctyl phthalate, octyldecyl phthalate, diisodecyl phthalate, butylbenzyl phthalate, and di(2-ethylhexyl) isophthalate; phosphoric acid ester plasticizers such as tributyl phosphate, tri(2-ethylhexyl) phosphate, (2-ethylhexyl) diphenyl phosphate, and tricresyl phosphate; adipic acid ester plasticizers such as di(2-ethylhexyl)adipate, diisodecyl adipate, (n-octyl) (n-decyl) adipate, and (n-heptyl) (n-nonyl) adipate; sebacic acid ester plasticizers such as dibutyl sebacate, di(2-ethylhexyl) sebacate, dioctyl sebacate, and diisooctyl sebacate; azelaic acid ester plasticizers such as di(2-ethylhexyl) azelate, dihexyl azelate, and diisooctyl azelate; citric acid ester plasticizers such as triethyl citrate, triethyl acetylcitrate, tributyl citrate, tributyl acetylcitrate, and tri(2-ethylhexyl) acetylcitrate; glycolic acid ester plasticizers such as methyl phthalyl ethylglycolate, ethyl phthalyl ethylglycolate, and butyl phthalyl butylglycolate; trimellitic acid ester plasticizers such as tri(2-ethylhexyl) trimellitate, trioctyl trimellitate, di(n-octyl) mono(n-decyl) trimellitate, and diisooctyl monoisodecyl trimellitate; ricinoleic acid ester plasticizers such as methyl acetyl ricinoleate, and butylacetyl ricinoleate; glycerol plasticizers such as glycerol diacetomonolaurate, glycerol monoacetomonostearate, and medium chain fatty acid triglyceride; epoxy plasticizers such as epoxidized soybean oil, epoxidized linseed oil, and epoxidized (2-ethylhexyl)ester of tall oil fatty acid; polyester plasticizers such as (1,3-butanediol) (2-ethylhexanol) adipate polyester, (1,6-hexanediol) (2-ethylhexanol) sebacate polyester, (propyleneglycol) (coconut oil fatty acid) adipate polyester, and the like.

As the present invention aims at providing the soft thermoplastic resin composition having a small environmental load, it is preferable not to use the phthalic acid ester plasticizer, suspected of being an environmental hormone. The more preferable plasticizer are the polyester plasticizers, which have the small plasticizer migration and bleeding out property, the trimellitic acid plasticizers such as trimellitic acid esters, the glycolic acid plasticizers such as glycolic acid esters, the citric acid plasticizers such as citric acid esters, the glycerol plasticizers, the azelaic acid plasticizers such as azelaic acid esters, the sebacic acid plasticizers such as sebacic acid esters, and the adipic acid plasticizers such as adipic acid esters; the even more preferable plasticizers are, in terms of the cold-resistance, the trimellitic acid plasticizers, the glycolic acid plasticizers, the glycerol plasticizers, the azelaic acid ester plasticizers, the sebacic acid plasticizers, and the adipic acid plasticizers; still even more preferably plasticizers are, in terms of the balance between the environmental load and the safety, the glycolic acid plasticizers and the glycerol plasticizer; and the particularly preferable plasticizers are the glycerol plasticizers, because they have the excellent compatibility with both of the vinyl chloride resin and the polyhydroxyalkanoate. The plasticizer may be used alone or as a mixture of two or more kinds.

The resin composition of the invention, which contains the plasticizer, contains 0.1 to 8 parts by weight of the resin component (B) and 22 parts by weight or less of the plasticizer based on 100 parts by weight of the resin component (A). In the resin composition of the invention, a blending ratio of the vinyl chloride resin to the polyhydroxyalkanoate (parts by weight, the vinyl chloride resin/the polyhydroxyalkanoate) in the resin component (A) may be set within a range of 15 to 65/35 to 85, 25 to 65/35 to 75, 35 to 65/35 to 65, 35 to 60/40 to 65, 40 to 60/40 to 60, or 40 to 55/45 to 60. The blending amount (parts by weight) of the resin component (B) may be within a range of 0.1 to 8, 0.5 to 7, or 1 to 5. The blending amount (parts by weight) of the plasticizer may be within a range of 22 or less, 18 or less, 12 or less, 7 or less, or 3 or less.

<Stabilizer for Vinyl Chloride Resin>

The resin composition of the invention may contain a stabilizer for the vinyl chloride resin, within a range in which its excellent softness, transparency, and mold-processability are not impaired. The vinyl chloride resin has a comparatively lower decomposition temperature, and thus it is preferable that the composition contains the stabilizer for the vinyl chloride resin. As the stabilizer for the vinyl chloride resin, a known stabilizer may be used. For example, it is possible to use one or more stabilizers for the vinyl chloride resin selected from the group consisting of metal soap stabilizers, lead salt stabilizers, metal liquid stabilizers, organotin stabilizers, and non-metal stabilizers.

The metal soap stabilizer is often used to attempt a synergistic effect, in which a larger effect can be obtained by using it together with another one, rather than a case where it is used alone. Specific examples thereof may include calcium stearate, barium stearate, zinc stearate, and the like.

The lead salt stabilizer has a strong heat stability and an excellent weatherability. Specific examples thereof may include tribasic lead sulfate, dibasic lead phosphite, and the like.

The metal liquid stabilizer has a good compatibility with a resin or a plasticizer and has an effect of decreasing the softening temperature. It is, accordingly, characterized by suitably applying to soft applications. Specific examples thereof may include Ba/Zn stabilizers, Ca/Zn stabilizers, and the like.

The organotin stabilizer has the excellent heat resistance and weatherability, similar to the lead salt stabilizer, and it is characterized by having a large gelation promoting effect of the vinyl chloride resin. Specific examples thereof may include laurate, maleate, mercapride (or mercapto) stabilizers.

The non-metal stabilizer is a compound having substantially no metal or having no metal at all, and it is an important existence when the stabilizer is assembled in lead removal. Specific examples thereof may include epoxy compounds, phosphites, β-diketone compound, and the like.

The other stabilizer may include polyhydric alcohols such as sorbitol, trimethylol propane, pentaerithritol; N-containing compounds such as diphenylthiourea, β-aminocrotonic acid esters, 2-phenyl indole, and dicyandiamide; hydrotalcites, and the like.

The resin composition of the invention are often applied to application requiring the transparency, and thus it is preferable to use the metal liquid stabilizer or the organotin stabilizer, having the excellent transparency. In addition, in order to increase the stability, another stabilizer may be suitably added.

It is preferable that the blending amount of the stabilizer is as small as possible, in terms of the sanitation, and a minimum amount, which is necessary for molding, of the stabilizer is used. Specifically, the amount thereof is preferably from 0.1 to 5 parts by weight, more preferably from 0.1 to 4 parts by weight, even more preferably from 0.5 to 4 parts by weight, still even more preferably from 1 to 4 parts by weight, particularly preferably from 1 to 3.5 parts by weight, based on 100 parts by weight of the vinyl chloride resin. When the blending amount of the stabilizer is less than 0.1 parts by weight based on 100 parts by weight of the vinyl chloride resin, the heat stability may sometimes be insufficient, and when it is more than 5 parts by weight, sticking or plate-out may occur during molding, bleeding-out from the molded article may occur, the transparency may be insufficient, or an eluting amount is too large in an elution test.

The resin composition of the invention, which contains the stabilizer for the vinyl chloride resin, contains 0.1 to 8 parts by weight of the resin component (B) and 0.1 to 5 parts by weight of the stabilizer for the vinyl chloride resin based on 100 parts by weight of the resin component (A). The resin composition of the invention, which contains the plasticizer and the stabilizer for the vinyl chloride resin, contains 0.1 to 8 parts by weight of the resin component (B) and 22 parts by weight or less of the plasticizer based on 100 parts by weight of the resin component (A), and 0.1 to 5 parts by weight of the stabilizer for the vinyl chloride resin based on 100 parts by weight of the vinyl chloride resin.

In the two kinds of the resin compositions of the invention described above, a blending ratio of the vinyl chloride resin to the polyhydroxyalkanoate (parts by weight, the vinyl chloride resin/the polyhydroxyalkanoate) in the resin component (A) may be set within a range of 15 to 65/35 to 85, 25 to 65/35 to 75, 35 to 65/35 to 65, 35 to 60/40 to 65, 40 to 60/40 to 60, or 40 to 55/45 to 60. The blending amount (parts by weight) of resin component (B) may be within a range of 0.1 to 8, 0.5 to 7, or 1 to 5. The blending amount (parts by weight) of the plasticizer may be within a range of 22 or less, 18 or less, 12 or less, 7 or less, or 3 or less. The blending amount (parts by weight) of the stabilizer for the vinyl chloride resin may be within a range of 0.1 to 5, 0.1 to 4, 0.5 to 4, 1 to 4, or 1 to 3.5.

<Other Compounding Agent, Thermoplastic Resin, and Elastomer, which can be Added>

To the resin composition of the invention may be added, if necessary, one or more components selected from the group consisting of known compounding agents, thermoplastic resins other than the resin component (A) and the resin component (B), and elastomers within a range in which the effects of the present invention are not impaired.

(Compounding Agent)

As the compounding agent, compounding agents which are usually added to a resin composition may be used without any limitation, and examples thereof may include fillers, reinforcements, anti-oxidants, ultraviolet absorbents, flame retardants, anti-static agents, lubricants, stabilizers, coloring agents, fungicidal microbicide, surface-treating agents, ant repelling agents, repellents for mice, reodorants, releasing agents, fluidity improving agents, compatibilizers, melt-viscosity controlling agents, light diffusing agents, antifouling agent, antifogging agents, nucleating agents, infrared absorbents, and the like.

Any known filler and reinforcing agent may be used, and examples thereof may include powdery fillers such as calcium carbonate, silica, and clay; flat plate fillers such as mica, talc, kaolin clay, graphite, and selenite; needle-shaped fillers such as asbestos, wollastonite, sepiolite, phosphate fiber, gypsum fiber, and MOS; spherical fillers such as shirasu balloon, glass balloon, and carbon balloon; fiber fillers such as linter, glass fibers, aramid fibers, carbon fibers, and natural fibers; other fillers such as tetrapod-shaped zinc oxide. The diameter of the powdery, spherical, needle-like, or fiber fillers and the thickness of the at plate fillers are preferably 10 μm or less, more preferably 3 μm or less, even more preferably 1 μm or less, particularly preferably 0.3 μm or less, because of the excellent transparency.

Any known antioxidant may be used, and examples thereof may include phenol antioxidants exemplified by 2,6-di-tert-butyl-para-cresol; amine antioxidants exemplified by phenyl-β-naphthylamine; sulfur antioxidants exemplified by lauryl stearyl thiodipropionate; phosphorus antioxidants exemplified by tridecyl phosphite; hydrazine antioxidants exemplified by N-salicyloyl-N'-aldehydehydrazine; amide antioxidants exemplified by N,N'-diphenyl oxide; acid antioxidants exemplified by phosphoric acid and citric acid, and the like.

Any known ultraviolet absorbent may be used, and examples thereof may include benzophenone ultraviolet absorbents, salicylate (benzoate) ultraviolet absorbents, benzotriazole ultraviolet absorbents, and cyanoacrylate ultraviolet absorbents. In addition, it may also include metal complex salts, which are used as a quencher, and hindered piperidine, which is used as a hindered amine light stabilizer (HALS).

Any known flame retardant may be used, and examples thereof may include halogen flame retardants exemplified by tetrabromobisphenol A and brominated polystyrene; phosphorus flame retardants, which improve the flame retardance by using it together with the halogen flame retardant, exemplified by antimony trioxide, triphenyl phosphate, tricresyl phosphate, and resorcinol bis(diphenylphosphate); and inorganic flame retardants exemplified by aluminum trihydroxide and magnesium dihydroxide. It is preferable to use the phosphorus flame retardant, because it has the excellent compatibility with the resin component (A), and shows a softening effect.

Any known anti-static agent may be used, and examples thereof may include cationic active agent-type anti-static agents exemplified by primary amine salts, tertiary amine, and quaternary ammonium compounds; anionic active agent-type anti-static agents exemplified by sulfonated oil, soap, alkyl sulfate salts, alkyl benzene sulfonates, phosphate salts; nonionic active agent-type anti-static agents exemplified by partially fatty acid esters of polyhydric alcohol, ethylene oxide adduct of aliphatic alcohol, and ethylene oxide adducts of alkyl naphthol; and amphoteric active agent-type anti-static agents exemplified by carboxylic acid derivatives and imidazoline derivatives. Similarly, various polymer-type anti-static agents may be used.

Any known lubricant may be used, and examples thereof may include hydrocarbon lubricants exemplified by paraffin and polyethylene wax; aliphatic acid lubricants exemplified by higher fatty acids and hydroxy fatty acids; fatty acid amide lubricants exemplified by fatty acid amide and alkylene bisfattyacid amide; ester lubricants exemplified by lower alcohol esters of fatty acid and polyglycol ester; alcohol lubricants exemplified by aliphatic alcohols and polyglycol; polymer lubricants exemplified by various metal soaps and silicone, and the like.

Any known nucleating agent may be used, and examples thereof may include higher fatty acid amide, urea derivatives, sorbitol compounds, boron nitride, higher fatty acid salts, aromatic fatty acid salts, and the like. Of these, the higher fatty acid amide, the urea derivative, and the sorbitol compound are preferable, because of the high effect as the nucleating agent.

Each of the compounding agents described above may be used alone or as a mixture of two or more kinds.

(Thermoplastic Resin other than Resin Component (A) and Resin Component (B))

The thermoplastic resin other than the resin component (A) and the resin component (B), which can be preferably used in the present invention, may include, for example, polyester resins; polycarbonate resins; polyamide resins; polyacetal resins; polyvinyl acetal resins; polyketone resins; polyolefin resins; and vinyl polymer or copolymer resins obtained by polymerization or copolymerization of one or more vinyl monomers selected from the group consisting of diene compounds, maleimide compounds, aromatic alkenyl compounds, methacrylic acid esters, acrylic acid esters, and vinyl cyanide compounds. They may be used alone or as a mixture of two or more kinds.

The polyester resin may be exemplified by resins obtained by polycondensation of a dicarboxylic acid or a derivative thereof such as an alkyl ester with a diol; resin obtained by polycondensation of a monomer having both of a carboxylic acid or a derivative thereof such as an alkyl ester, and a hydroxyl group in one molecule; and resins obtained by ring-opening polymerization of a monomer having a cyclic ester structure in one molecule. The term polyester resin here is the resin other than the polyhydroxyalkanoate which is used as the resin component (A).

The dicarboxylic acid forming the polyester resin may include terephthalic acid, isophthalic acid, naphthalene dicarboxylic acid, succinic acid, adipic acid, sebacic acid, and the like. The dial may include ethane dial, propane diol, butane diol, pentane diol, neopentyl glycol, hexane diol, cyclohexane dimethanol, and the like. The monomer having both of a carboxylic acid or a derivative thereof such as an alkyl ester and a hydroxyl group in one molecule may include lactic acid and the like. The monomer having a cyclic ester structure in one molecule may include caprolactone and the like.

Specific examples of the polyester resin may include polymethylene terephthalate, polyethylene terephthalate, polypropylene terephthalate, polytetramethylene terephthalate, polybutylene terephthalate, polyhexamethylene terephthalate, polycyclohexanedimethylene terephthalate (which hereinafter may sometimes be referred to as PCT), poly(ethylenecyclohexenedimethylene)terephthalate, glycol modified polyethylene terephthalate (which hereinafter may sometimes be referred to as PETG), polyethylene naphthalate, polytrimethylene naphthalate, polybutylene naphthalate, polycyclohexanedimethylene naphthalate, polyarylate, polylactic acid, polysuccinic acid ethylene, polysuccinic acid butylene, polyadipic acid butylene, poly-ε-caprolactone, poly(α-oxyacid), and copolymers thereof. In the present invention. PETG, polylactic acid, polysuccinic acid ethylene, polysuccinic acid butylene, polyadipic acid butylene, poly-ε-caprolactone, and poly(α-oxyacid) are particularly preferable, because they have the excellent compatibility with the resin component (A). They may be copolymer thereof.

The polycarbonate resin is obtained by reaction of a dihydric phenol with phosgene or a carbonate precursor, and may include aromatic polycarbonate resins, and aliphatic polycarbonate resins. Any of them may be used, and the aliphatic polycarbonate resins are preferable in terms of the compatibility with the resin component (A) and the decomposition temperature. In addition, copolymers with a polyamide-polycarbonate resin, a polyester-polycarbonate resin, or the like may be used.

The polyamide resin may include polyamides obtained from an aliphatic, alicyclic, or aromatic diamine and an aliphatic, alicyclic, or aromatic dicarboxylic acid, polyamides obtained by a ring-opening polymerization of a lactam such as ε-caprolactam or ω-dodecalactam, or polyamides obtained from 6-aminocaproic acid, 1,1-aminoundecanoic acid, 1,2-aminododecanoic acid, or the like in which the polyamides may be hornopolymers, copolymers of the polyamide, and blends thereof. The aliphatic polyamide resins are preferable in terms of the compatibility with the resin component (A) and the decomposition temperature. Of these, nylon-6, nylon-6,6, nylon-11, nylon-12, nylon-6,10, nylon-4,6, copolymers thereof, and blends thereof, which are industrially produced at a low cost and in a large amount, are more preferable. From the same viewpoint, nylon-11 and nylon-12 are even more preferable.

The polyacetal resin refers to a polyoxymethylene, which includes homopolymer-type resins, copolymer-type resins, and block-polymer-type resins. A copolymerizable component in the copolymer and block-polymer may include oxyethylene, oxytrimethylene, oxytetramethylene, and the like. The copolymer-type resin is preferable in terms of the compatibility with the resin component (A) and the decomposition temperature.

The polyvinyl acetal resin refers to a polyvinyl alcohol modified with an aldehyde, and may include polyvinyl formal, polyvinyl butyral, and the like.

The polyketone resin may include aromatic polyketones, alicyclic polyketones, aliphatic polyketones. The aliphatic polyketone is preferable in terms of the compatibility with the resin component (A) and the decomposition temperature. Examples of the aliphatic polyketone may include alternating copolymers of ethylene and carbon monooxide, alternating copolymers of an α-olefin and carbon monooxide, and the like.

The polyolefin resin may include not only polymers from an olefin alone exemplified by polyethylene, polypropylene, polymethylpentene, polybutene, cycloolefinpolymer, and copolymers thereof, but also copolymers of an olefin and copolymerizable compound having at least one double bond copolymerizable with the olefin. The copolymerizable compound may include (meth)acrylic acid and its esters, maleic acid and its esters, maleic anhydride, vinyl acetate; vinyl chloride, carbon monooxide, and the like. It is preferable to use the copolymerizable compound in a ratio of 40% by weight or less.

There are several methods to disperse the polyolefin resin in the resin component (A). The polyolefin resin is divided into a non-reactive type and a reactive type, in which the non-reactive type is a type which is reacted neither with the vinyl chloride resin nor the polyhydroxyalkanoate, and the reactive type is a type which is reacted either or both with the vinyl chloride resin and the polyhydroxyalkanoate.

The non-reactive type may specifically include ethylene-vinyl acetate copolymers, ethylene-vinyl acetate-carbon monooxide copolymers, ethylene-acrylic acid ester-carbon monooxide copolymers, ethylene-vinyl chloride copolymers, and the like. They have the good compatibility with the resin component (A), and thus they can easily form alloy with the resin component (A) only by melt-kneading.

The reactive type may specifically include non-reactive type polyolefin resin with which a monomer having a reactive functional group is copolymerized, mainly in a case of the reaction with the polyhydroxyalkanoate, and typical reactivity functional groups may include an epoxy group, an acid group for oxo group), a hydroxyl group, an isocyanate group, and the like. The reaction may be performed at an appropriate processing temperature using, if necessary, a reaction blocking agent or a reaction accelerator. Another approach in the reactive type may include a dynamically cross-linking method. The reaction with the polyhydroxyalkanoate can be performed using a radical generator capable of effectively generating radicals at a processing temperature. The radical generator is mainly reacted with the polyhydroxyalkanoate, and forms a covalent bond between the polyhydroxyalkanoate and the reactive type, whereby it functions as a compatibilizer, thus resulting in obtaining the alloyed product.

The other vinyl resin may include polymer and copolymer resins obtained by polymerization or copolymerization of one or more monomers selected from the group consisting of diene compounds, maleimide compounds, aromatic alkenyl compounds, methacrylate, acrylate, and vinyl cyanide compound.

The polymer and the copolymer resin may include polystyrene resins, s-polystyrene resins, poly methyl methacrylate resins, polychlorostyrene resins, polybromostyrene resins, poly-α-methyl styrene resins, styrene-acrylonitrile copolymer resins, styrene-methyl methacrylate copolymer resins, styrene-maleic anhydride copolymer resins, styrene-maleimide copolymer resins, styrene-N-phenyl maleimide copolymer resins, styrene-N-phenyl maleimide-acrylonitrile copolymer resins, methyl methacrylate-butyl acrylate copolymer resins, methyl methacrylate-ethyl acrylate copolymer resins, styrene-acrylonitrile-α-methyl styrene terpolymer resins, butadiene-styrene copolymer (HIPS) resins, acrylonitrile-butadiene rubber-styrene copolymer (ABS)resins, acrylonitrile-acrylic rubber-styrene copolymer (ASA), acrylonitrile-ethylene propylene rubber-styrene copolymers, acrylonitrile-ethylene propylene diene rubber-styrene copolymers, acrylonitrile-butadiene rubber-α-methyl styrene copolymer resins, aromatic alkenyl compound-diene-vinyl cyanide-N-phenyl maleimide copolymer resins, and the like.

Of the other vinyl resins described above, the polymethyl methacrylate resins, styrene-acrylonitrile copolymer resins, acrylonitrile-butadiene rubber-styrene copolymer (ABS) resins, acrylonitrile-acrylic rubber-styrene copolymers (ASA), acrylonitrile-ethylene propylene rubber-styrene copolymers, and acrylonitrile-ethylene propylene diene rubber-styrene copolymers are preferable in terms of the compatibility with the resin component (A) and the decomposition temperature.

However, in the present invention, the composition containing either or both of the (meth)acrylate resin and the acrylonitrile styrene resin having a weight average molecular weight, in terms of the polystyrene, of 400,000 or more, which is used as the resin component (B), is excluded. In addition, the processable upper limit temperature, when considering the decomposition temperature of the vinyl chloride resin, is about 220° C., and the processable upper limit temperature, when considering the decomposition temperature of the polyhydroxyalkanoate, is about 240° C.

The blending amount of the thermoplastic resin is preferably 40 parts by weight or less, more preferably 30 parts by weight or less, even more preferably 20 parts by weight or less, particularly preferably 10 parts by weight or less, based on 100 parts by weight of the resin component (A). These thermoplastic resin are secondarily used in order to keep the quality balance of the resin composition of the invention, and when the blending amount of the thermoplastic resin is more than 40 parts by weight, the softness and mechanical properties of the resin composition of the invention may sometimes be reduced.

(Elastomer)

Any natural rubber or synthetic rubber may be used without any limitation as the elastomer. The synthetic rubber may include, for example, acrylic rubber such as butyl acrylate rubber, ethyl acrylate rubber, and octyl acrylate rubber; nitrile rubber such as a butadiene-acrylonitrile copolymer; chloroprene rubber, butadiene rubber, isoprene rubber, isobutylene rubber, styrene-butadiene rubber, methyl methacrylate-butyl acrylate block-copolymers, styrene-isobutylene block-copolymers, styrene-butadiene block-copolymers, hydrogenated styrene-butadiene block-copolymers, ethylene-propylene copolymers (EPR), hydrogenated ethylene-butadiene copolymers (EPDM), ethylene-vinyl acetate copolymers, ethylene-vinyl acetate-carbon monooxide copolymers, polyurethane, chlorosulfonated polyethylene, silicone rubber (millable type and room temperature vulcanizable type), butyl rubber, fluororubber, olefin thermoplastic elastomer, styrene thermoplastic elastomer, urethane thermoplastic elastomer, polyamide thermoplastic elastomer, polyester thermoplastic elastomer, fluorine-containing thermoplastic elastomer, and the like.

Rubber having a multiple bond in its structure can form an alloy structure capable of expressing the sufficient quality due to the dynamical cross-linking, even if the compatibility with the resin component (A) is low.

In the elastomer described above, the methyl methacrylate-butyl acrylate block-copolymer, ethylene-vinyl acetate copolymer, ethylene-vinyl acetate-carbon monooxide copolymer, and urethane thermoplastic elastomer are preferable, and the ethylene-vinyl acetate-carbon monooxide copolymer is particularly preferable, because of the excellent compatibility with the resin component (A).

<Compounding and Molding>

In the present invention, the vinyl chloride resin and the polyhydroxyalkanoate as the resin component (A); at least one resin selected from the group consisting of (meth) acrylate resins and acrylonitrile styrene resins having a weight average molecular weight, in terms of the polystyrene, of 400,000 or more as the resin component (B); and, if necessary, at least one member selected from the group consisting of the plasticizer, the stabilizer for the vinyl chloride resin, the compounding agent, the thermoplastic resin other than the resin component (A) and the resin component (B), and the elastomer are used as the starting materials, and the starting materials are compounded in a known method, whereby the resin composition of the invention can be obtained, and further the obtained resin composition of the invention can be molded in a known method.

As for the compounding, the compound may be a non-melted compound obtained just by mixing the starting materials described above, without melting them, or may be a granular compound, which has a shape capable of being easily molded, obtained by compressing or sticking the non-melted compound, or completely melting the non-melted compound. In any case, the starting materials may be added at once, or added in stages in mid-course. In particular, when the starting materials are different shapes to each other, for example, pellets, a powder, and liquid, it is preferable to add them by using multiple feeders.

Any known method may be utilized for preparing the non-melted compound, and examples thereof may include methods using a mixer such as a Henschel mixer or a tumbler. Any known method may also be utilized for preparing the granular compound, and examples thereof may include methods using a kneader such as a roll compaction machine, a gear pelletizer, Banbury mixer, or various extruders.

In order to show the mold-processability and the qualities (the mechanical properties, the softness, the transparency, the low plasticizer migration, and the like) of the resin composition of the invention by sufficiently expressing the performances of the vinyl chloride resin, to a maximal degree, it is necessary to apply heat and shear to the vinyl chloride resin, whereby the vinyl chloride resin is sufficiently gelled. When a whole amount of the polyhydroxyalkanoate is added before the vinyl chloride resin is sufficiently melt-kneaded, the melt-viscosity of the mixture is reduced, the shear is not applied to the vinyl chloride resin, and the gelation is not sufficiently advanced, thus resulting in the reduction of the mechanical properties and the transparency of the obtained molded article. It is preferable, accordingly, that the vinyl chloride resin is sufficiently gelled by an appropriate melt-kneading method.

As the appropriate melt-kneading method described above may preferably include, for example, a first melt-kneading method in which after the vinyl chloride resin is melt-kneaded, the polyhydroxyalkanoate is after-added, and they are melt-kneaded; a second melt-kneading method in which after the vinyl chloride resin and a part of the polyhydroxyalkanoate are mixed and melt-knead, the remainder of the polyhydroxyalkanoate is added to the obtained kneaded product at once or in batches, and the mixture is melt-kneaded; a third melt-kneading method in which the whole amount of the vinyl chloride resin is mixed and melt-kneaded, or the whole amount of the vinyl chloride resin and a part of the polyhydroxyalkanoate are mixed and melt-kneaded to form a solid compound (for example, pellets), and the solid compound is mixed with the whole amount of the polyhydroxyalkanoate or the remainder thereof and the mixture is melt-kneaded, and the like.

Specific examples of the second melt-kneading method may include a method containing a pre-kneading step of melt-kneading the vinyl, chloride resin and a part of the polyhydroxyalkanoate; and a main-kneading step of adding the remainder of the polyhydroxyalkanoate to the kneaded product obtained in the pre-kneading step once or in batches while, if necessary, the kneaded product is molded and the shape thereof is kept, and then melt-kneading the mixture. At that time, a kneaded product obtained in the pre-kneading step is compounded, and the obtained compound is melted and may be used in the main-kneading step as a kneaded product obtained in the pre-kneading step. Alternatively, the kneaded product obtained in the main-kneading step may be compounded and molded in a molding method described below. When a homopolymer having a degree of polymerization of 750 to 1200 or 900 to 1200 is used as the vinyl chloride resin, and the amount of the polyhydroxyalkanoate added in the pre-kneading step is set at 5 to 90% by weight, 10 to 80% by weight, or 12 to 75% by weight, of the total blending amount, both of the moldability and the physical properties of the obtained molded article can be obtained at a very high level.

The melt-kneading methods described above are preferable, because both of the sufficient gelation of the vinyl chloride resin and the compatibility of the vinyl chloride resin with the polyhydroxyalkanoate can be realized at a high level by the melt-kneading methods, and the molded article can be obtained which has the excellent transparency, softness, and mechanical properties, and has the remarkably reduced plasticizer migration. The second melt-kneading method is more preferable among the methods described above, because it further improves the moldability of the resin composition of the invention or the physical properties of the obtained molded article.

It is preferable that the vinyl chloride resin and the polyhydroxyalkanoate, used in the kneading method described above, are separately compounded. The compound of the vinyl chloride resin may include, in addition to the vinyl chloride resin, a part of the resin component (B), the stabilizer for the vinyl chloride resin, the plasticizer, the lubricant, and the like. In addition, the compound of the polyhydroxyalkanoate may include, in addition to the polyhydroxyalkanoate, the remainder of the resin component (B), the plasticizer, the lubricant, and the like.

In the compound of the vinyl chloride resin, the plasticizer is added, for example, to further promote the gelation of the vinyl chloride resin. It is preferable that the plasticizer is added, before the vinyl chloride resin is melted, to the vinyl chloride resin in an amount of preferably 60% by weight or more, more preferably 70% by weight or more, even more preferably 80% by weight or more, still even more preferably 90% by weight or more, particularly preferably 100% by weight, of the whole amount of the plasticizer.

The resin component (B) not only promotes the gelation of the vinyl chloride resin, as with the plasticizer, but also has a function as a melt-viscosity regulator. In order to effectively and uniformly melt-mix two or more resins as much as possible, it is preferable that the difference in the melt-viscosity is as small as possible in the two or more resins, as derived from Wu's formula (S. Wu, J. Polym. Sci., C34, 19 (1971)). From this viewpoint, it is preferable that the resin component (B) is contained in the compound of the vinyl chloride resin or the polyhydroxyalkanoate, as described above, or it is appropriately divided into several portions, and added to the melt-kneaded product of the vinyl chloride resin and the polyhydroxyalkanoate in batches.

The thus obtained resin composition of the invention is molded, whereby the molded article of the present invention, which has the excellent transparency, softness, and mechanical properties, and the remarkably reduced plasticizer migration, can be obtained.

Examples of the molding method may include injection methods (insert molding, two-color molding, sandwich molding, gas injection molding, and the like), extrusion molding methods, inflation molding methods, T-die film forming methods, lamination molding methods, blow-molding ethods, hollow molding methods, compression molding methods, calendar molding methods, rotational molding methods, transfer molding methods, vacuum molding methods, powder slush molding methods, cast molding methods, and the like.

In the resin composition of the invention, the melt-viscosity can be widely controlled and it can be applied to various molding methods by changing the blending amount or the weight average molecular weight of the resin component (B), containing the plasticizer or not, or changing the blending amount of the plasticizer when it is added, as described above. Considering the melt-viscosity range in a composition capable of easily expressing the quality, it is preferable to use the injection molding method, the extrusion molding method, the inflation molding method, the T-die film forming method, the blow-molding method, the calendar molding method, or the vacuum molding method. The injection molding method, the extrusion molding method, the T-die film forming method, and the calendar molding method are more preferable, the extrusion molding method and the calendar molding method are even more preferable, and the calendar molding method is particularly preferable.

Next, the calendar molding method is shown as one example of the molding methods of the resin composition of the invention. The calendar molding method is a molding method containing a roll forming step and a cooling step as essential steps, and if necessary, a pre-kneading step performed before the roll forming step, a press-forming step performed after the roll forming step, and the like. In the roll forming step, one or more kneading molding machines comprising two or more rolls having a heater therein are used. Typical kneading molding machines may include, for example, mixing roll formed of two rolls, warming roll formed of two rolls, and the like. If necessary, after the rolls, a calendar roll formed of 4 to 9 rolls may be installed.

In the roll forming step, the resin component (A), the resin component (B), and the other starting materials such as the compounding agent are supplied to the surface of the rolls which are heated to a pre-determined temperature and are rotated, whereby the starting materials are melt-kneaded and the obtained kneaded product is formed into a sheet. Here, the temperature of the roll surface is suitably selected depending on the kind of the starting material, the blending amount, and the like, and it is selected from a range of generally 150 to 200° C., preferably 155° C. to 195° C., more preferably 160 to 190° C. As the resin component (A) supplied to the roll surface, a compound in which a part of the resin component (B) and the lubricant are added to the vinyl chloride resin; a compound in which all or a part of the polyhydroxyalkanoate, all or a part of the resin component (B), lubricant, and the like are added to the vinyl chloride resin by the second melt-kneading method; and a compound in a pellet state, obtained by the third melt-kneading method are preferable.

In the pre-kneading step performed before the roll forming step if necessary, as the kneader, for example, a batch type Banbury mixer, a planetary extruder, a single-screw extruder, a twin-screw extruder, or the like are used. In this step, the starting materials are compounded, or the starting materials and the compounds thereof and the like are previously melted. When the pre-kneading step is performed, the productivity of the calendar molding can be increased.

In the press-forming step performed after the roll forming step if necessary, both ends in the width direction of the sheet-like molded article, obtained in the roll forming step, is cut according to the demand using a press-forming machine containing a heating press and a cooling press disposed on the downstream side of the heating press, the obtained sheets are joined on top of each other, the overlapped sheets are put in a heating press to pre-heat and pressure-heat the sheets, and, immediately after, the sheets are put in a cooling press to cool them, whereby a sheet-like molded article formed of the resin composition of the invention and having a pre-determined thickness can be obtained. The heating temperature of the heating press on the pressure-heat is suitably selected depending on the composition of the resin composition of the invention forming the sheet-like molded article, and it is selected from a temperature range of preferably about −20° C. to +20° C. higher, more preferably about −10° C. to +10° C. higher than the surface temperature of the roll (a melt-kneading temperature) in the roll forming step. The press pressure of the heating press and the cooling press is not particularly limited, and it is appropriately selected depending on the composition of the resin composition of the invention forming the sheet-like molded article, the design thickness of the sheet-like molded article, or the like.

The preferable embodiments of the method for producing the molded article comprising the resin composition of the invention may include, for example, a method comprising a pre-kneading step of melt-kneading the vinyl chloride resin and a part of the polyhydroxyalkanoate; a main kneading step of adding the remainder of the polyhydroxyalkanoate to the kneaded product obtained in the pre-kneading step once or in batches, while the shape of the kneaded product is regulated if necessary, and melt-kneading the mixture; and a forming step of forming the kneaded product obtained in the main kneading step or the kneaded product having a pre-determined shape into a molded article having a desired shape. When the calendar molding method is utilized in this production method, for example, in the pre-kneading step of the calendar molding, the main kneading step, or the pre-kneading step and the main kneading step of the production method may be performed, and in the roll forming step and press-forming step, the forming step of the production method may be performed.

EXAMPLE

The present invention is explained in more detail on the basis of Examples, but the present invention is not limited to only Example. In the present Examples, "parts" and "%" shows "parts by weight" and "% by weight", respectively, unless otherwise noted. A measurement method of each physical properties is as follows:

(1) Method of Measuring HAZE

An HAZE of a sheet-like molded article having a thickness of LO mm, obtained by a press-forming described below, was measured using a haze meter (manufactured by Nippon Denshoku Industries Co., Ltd., a model: NDH 2000) in accordance with JIS K 7136.

(2) Tensile Testing Method

A tensile breaking stress, a tensile break elongation, and a tensile elasticity of a sheet-like molded article having a thickness of 1.0 mm, obtained by the press-forming, was measured in accordance with JIS K 6251. The shape of a test piece was a No. 2 dumbbell piece, and a test speed was 500 mm/minute.

(3) Plasticizer Migration Testing Method

A sheet-like molded article having a thickness of 1.0 mm, obtained by the press-forming, was put between black PMMA plates, to which a pressure of 1 MPa was applied, and it was kept in a thermostatic chamber having a temperature of 80° C. for 6 hours. After that, the molded article was peeled off from the black PMMA plates, and the black plates were classified into 1 to 4 ranks based on a degree of whitening of the black PMMA plate and the relative comparison was performed. Rank 4 is the best in which the plate is hardly whitened, and Rank 1 is the worst in which the plate is white due to the very high plasticizer migration. If the plate is in Rank 3 or more, the plate has no problem in the plasticizer migration.

(4) Evaluation Method of Air Mark and Flow Mark

A sheet-like molded article obtained by the roll-forming was visually observed, and the evaluation was performed according to the following criteria. The air mark refers to a molding failure of air bubble remaining in a sheet-like molded article, generated by a phenomenon in which air, caught in kneading, cannot go through between rollers when it is passed through them; and the flow mark refers to a molding failure of flow patterns remaining on the sheet-like molded article, caused by a phenomenon in which a resin rich area (also referred to as "roll bank") generated between the rolls is still left even after the resin is passed through between the rolls without relaxation.

<Evaluation Criteria of Air Mark>

⊚: No air marks are observed, and the appearance is beautiful with a high texture.

○: No air marks are observed, and the appearance is sufficient as a molded article of a general soft resin.

Δ: Air marks are observed by a careful observation, but the appearance is acceptable for practical use as a molded article of a general soft resin.

x: Air marks are observed, fine irregularities exist partly on the surface, and the appearance is poor.

<Evaluation Criteria of Flow Mark>

⊚: No flow marks are observed, and the appearance is beautiful with a high texture.

○: No flow marks are observed, and the appearance is sufficient as a molded article of a general soft resin.

Δ: Flow marks are observed by a careful observation, but the appearance is acceptable for practical use as a molded article of a general soft resin, x: Flow marks are observed, fine irregularities exist partly on the surface, and the appearance is poor.

(5) Evaluation Method of Particle

The particle used here refers to a non-melted resin, which can be confirmed by visually observing the sheet-like molded article. The evaluation was performed by a two-stage evaluation in which ○ (there is a non-melted resin in an amount so that there are no problems in practical use) and x (a non-melted resin can be easily visually observed, and there are problems in practical use).

Synthetic Example 1

Synthesis of PHA-2

As a polyester producing strain, KNK-631 strains (see WO2009/145164) were used. Culture was performed as follows: A composition of a mother seed medium was: meat extract: 1 w/v %, Bacto (trademark)-Tryptone (casein triptone, manufactured by Difco Inc.): 1 w/v %, yeast extract: 0.2 w/v %, $Na_2PO_4.12H_2O$: 0.9 w/v %, 0.15 w/v % (pH 6.8), and kanamycin sulfate: $5\times10^{-6}$ w/v %.

A composition of a preculture medium was: $Na_2PO_4.12H_2O$: 1.1 w/v %, $KH_2PO_4$: 0.19 w/v %, $(NH_4)_2SO_4$: 1.29 w/v %, $MgSO_4.7H_2O$: 0.1 w/v %, palm kernel oil olefin: 2.5 w/v %, a solution containing slight, amount of metal salts ($FeCl_3.6H_2O$: 1.6 w/v %, $CaCl_2.2H_2O$: 1 w/v %, $CoCl_2.6H_2O$: 0.02 w/v %, $CuSO_4.5H_2O$: 0.016 w/v %, and $NiCl_2.6H_2O$: 0.012 w/v % were dissolved in 0.1 N hydrochloric acid): 0.5 v/v %.

A composition of a polyester production medium was $Na_2PO_4.12H_2O$: 0.385 w/v %, $KH_2PO_4$: 0.067 w/v %, $(NH_4)_2SO_4$: 0.291 w/v %, $MgSO_4.7H_2O$: 0.1 w/v %, a solution containing slight amount of metal salts ($FeCl_3.6H_2O$: 1.6 w/v %, $CaCl_2.2H_2O$: 1 w/v %, $CoCl_2.6H_2O$: 0.02 w/v %, $CuSO_4.5H_2O$: 0.016 w/v %, and $NiCl_2.6H_2O$: 0.012 w/v % were dissolved in 0.1 N hydrochloric acid): 0.5 v/v %, an antifoaming agent (trade name: BIOSPUMEX 200K, manufactured by Cognis Japan Ltd.): 0.05 w/v %. As a carbon source, palm kernel oil olein, which was a low melting point fraction obtained by fractionating palm kernel oil, was used. As an aqueous phosphate solution for pouring, a solution having 4.00 w/v % of $Na_2HPO_4.12H_2O$ and 0.69 w/v % of $KH_2PO_4$ was used.

Glycerol stock (50 μl) containing KINK-631 strains was seeded in the mother seed medium (10 ml), which was cultured for 24 hours, and the resulting product was seeded in a 3 L jar fermenter (trade name: MDL-300 model, manufactured by B.E. Marubishi Co., Ltd.) containing 1.8 L of the preculture medium described above in a content of 1.0 v/v %. The culture was performed for 28 hours in running conditions of a culture temperature of 33° C., a stirring speed of 500 rpm, and an air flow rate of 1.8 L/minutes, while a pH was controlled to a range of 6.7 to 6.8. The pH was controlled by using a 7% aqueous ammonium hydroxide solution.

Next, a production culture of polyhydroxyalkanoate (PHA-2) was performed by seeding 5.0 v/v % of a pre-cultured mother seed in a 10 L jar fermenter (trade name: MDL-1000 model manufactured by B.E. Marubishi Co., Ltd.) containing 4.3 L of a production medium. The running conditions were that a culture temperature was 28° C., a stirring speed was 600 rpm, and an air flow rate was 6 L/minutes, and a pH was controlled to a range of 6.7 to 6.8.

The pH was controlled by using a 14% aqueous ammonium hydroxide solution. As a carbon source, palm kernel oil olein was poured in a specific substrate feed rate of 0.1 to 0.12 (g oils and fats)×(g net dry strain weight)−1×(h)−1 over the whole medium. Here, the specific substrate feed rate is an amount of oils and fats fed to a unit weight of a net strain per unit time, i.e., a culture variable defined as a pouring rate of oils and fats per a net dry strain weight. The net dry strain weight is a dry strain weight obtained by subtracting a contained polyester weight from the whole dry strain weight. The specific substrate feed rate is a value obtained from the above formula. In addition, an aqueous phosphate solution was continuously added after the culture was performed for 20 hours at a flow rate of a C/P ratio of 250 to 350. The culture was performed for about 64 hours. After the culture was finished, the strains were recovered by centrifugation, washed with methanol, and lyophilized, and the dry strain weight was measured.

To 1 g of the obtained dry strains was added 100 ml of chloroform, and the mixture was stirred at room temperature for 24 hours to extract polyhydroxyalkanoate from the strains. After the residue of the strains was filtered, the resulting product was concentrated in an evaporator until the amount was reached 30 ml, to which 90 ml of hexane was gradually added, and the mixture was stirred gently for one hour. After a precipitate was filtered, it was dried in a vacuum at 50° C. for 3 hours to obtain polyhydroxyalkanoate.

A composition analysis of the obtained polyhydroxyalkanoate was measured according to a gas chromatography as shown below. To 20 mg of the dry polyhydroxyalkanoate were added 2 ml of sulfuric acid-methanol mixed liquid (15:85) and 2 ml of chloroform, and the mixture was sealed. It was heated at 100° C. for 140 minutes to obtain a methyl ester of the PHA decomposition product. It was cooled, to which 1.5 g of sodium hydrogencarbonate was added little by little to neutralize it, and the resulting product was allowed to stand until the generation of carbonic acid gas was stopped. After 4 ml of diisopropyl ether was added thereto and the mixture was thoroughly mixed, the mixture was centrifuged, and a monomer unit composition of a polyester decomposition product in the supernatant was analyzed by a capillary gas chromatography. GC-17A, manufactured by Shimadzu Corporation, was used as the gas chromatograph, and NEUTRA BOND-1, manufactured by GL Sciences Inc. (a column length: 25 m, a column inside diameter: 0.25 mm, a liquid membrane thickness: 0.4 μm), was used as the capillary column. Hexane was used as the carrier gas, a column inlet pressure was 100 kPa, and 1 μl of a sample was injected. Temperature conditions were as follows: a temperature was risen from an initial temperature, 100° C. to 200° C. at a rate of 8° C./minute, followed by from 200° C. to 290° C. at a rate of 30° C./minute. As a result of the analysis under the conditions described above, the polyhydroxyalkanoate, obtained in Synthetic Example 1, was poly(3-hydroxybutyrate-co-3-hydroxyhexanoate) (P3HB3HH), and a molar ratio of the 3-hydroxybutyrate (3HB) in that composition was 87% by mole.

The molecular weight of the obtained polyhydroxyalkanoate was obtained by performing a gel permeation chromatography, as described below. In 10 ml of chloroform was dissolved 15 mg of the extracted PHA, and the solution was filtered through a 0.2 μm filter to obtain a sample for measurement. Measurement was performed using 0.05 ml of the obtained sample. SLC-10A (manufactured by Shimadzu Corporation) was used as the measurement system, two columns of Shodex GPC K-806L (manufactured by Showa Denko K. K.) were attached thereto in series, and a temperature of a column oven was set at 40° C. Chloroform was used as a mobile phase, and a flow rate was 1.0 ml/L. Detection was performed using an RI detector (RID-10A manufactured by Shimadzu Corporation). As a reference standard, polystyrenes (manufactured by Showa Denko K. K., a weight average molecular weight: about 7,000,000, about 1,070,000, 150,000, or 30,000), which were treated in the same manner as the production of the sample for measurement, were used. Calibration curves were made based on the measurement results of the reference standards, and a weight average molecular weight of a sample for measurement was calculated utilizing the calibration curve. The obtained sample had a weight average molecular weight of 550,000.

In Synthetic Example 1, P3HB3HH (PHA-2) having a 3HB ratio of 87% by mole and a weight average molecular weight of 550,000 was obtained.

Synthetic Example 2

Synthesis of PHA-3

PHA-3 was obtained as poly(3-hydroxybutyrate-co-3-hydroxyhexanoate) in the same manner as in Synthetic Example 1, except that the aqueous phosphate solution was continuously added at a flow rate of a C/P ratio of 600 to 800 after the culture was performed for 20 hours. In Synthetic Example 2, P3HB3HH (PHA-3) having a 3HB ratio of 89% by mole and a weight average molecular weight of 500,000 was obtained.

Synthetic Example 3

Synthesis of PHA-4

PHA-4 was obtained as poly(3-hydroxybutyrate-co-3-hydroxyhexanoate) in the same manner as in Synthetic Example 2 except that KNK-005 strains (see U.S. Pat. No. 7,384,766) was used instead of KNK-631 strains, and palm double olein oil was used as a carbon source. In Synthetic Example 3, P3HB3HH (PHA-4) having a 3HB ratio of 94% by mole and a weight average molecular weight of 490,000 was obtained.

Synthetic Example 4

Synthesis of PHA-1

KNK-005 trc-phaJ4b.ΔphaZ1,2,6 strains were used for culture production. The strains were produced in a method described below.

First, plasmids for gene disruption were produced as follows: PCR was performed using genome DNA of Cupriavidus necator H16 strain as a template and primers represented by SEQ NO. 1 and SEQ NO. 2. PCR was performed by repeating 25 cycles of (1) at 98° C. for 2 minutes, and (2) at 98° C. for 15 seconds, at 60° C. for 30 seconds, and at 68° C. for 2 minutes, and KOD-plus- (manufactured by Toyobo Co., Ltd.) was used as a polymerase. Similarly, PCR was performed using primers represented by SEQ NO. 3 and SEQ NO. 4. Further, using two kinds of DNA fragments obtained in the PCRs described above, as templates, PCR was performed using primers represented by SEQ NO.1 and SEQ NO. 4 in the same conditions as above, and the obtained DNA fragment was digested with a restriction enzyme SwaI. The DNA fragment was linked to a vector pNS2X-sacB described in JP-A No. 2007-259708, which was SwaI-digested, with DNA ligase (Ligation High, manufactured by Toyobo Co., Ltd.), thereby producing a plasmid vector for gene disruption pNS2X-phaZ6(−+), having base sequences on upstream and downstream the phaZ6 structural gene.

Further, PCR was performed in the same manner as above using genome DNA of *C. necator* H16 strain as a template and primers represented by SEQ NO. 5 and SEQ NO. 6. In addition, PCR was performed in the same manner as above using primers represented by SEQ NO. 7 and SEQ NO. 8. Furthermore, PCR was performed in the same manner as above using the two kinds of the DNA fragments, obtained in the PCRs above, as templates, and primers represented by SEQ NO. 5 and SEQ NO. 8, and the obtained DNA fragment was digested with the restriction enzyme SwaI. The DNA fragment was linked to vector pNS2X-sacB described in JP-A No. 2007-259708, which was SwaI-digested, with DNA ligase (Ligation High, manufactured by Toyobo Co., Ltd.), thereby producing a plasmid vector for gene disruption pNS2X-phaZ1(−+) having DNA sequences on upstream and downstream the phaZ1 structural gene.

Further, PCR was performed in the same manner as above using genome DNA of *C. necator* H16 strain as a template, and primers represented by SEQ NO. 9 and SEQ NO. 10. In addition, PCR was performed in the same manner as above using primers represented by SEQ NO. 11 and SEQ NO. 12. Furthermore, PCR was performed in the same manner as above using the two kinds of the DNA fragments, obtained in the PCRs above, as templates, and primers represented by SEQ NO. 9 and SEQ NO. 12, and the obtained DNA fragment was digested with restriction enzyme SwaI. The DNA fragment was linked to vector pNS2X-sacB described in JP-A No. 2007-259708, which was SwaI-digested, with DNA ligase (Ligation High, manufactured by Toyobo Co., Ltd.), thereby producing a plasmid vector for gene disruption vector pNS2X-phaZ2(−+) having DNA sequences on upstream and downstream the phaZ2 structural gene.

Next, gene-disrupted strains were produced. The plasmid vectors for gene disruption pNS2X-phaZ6(−+) were introduced into *E. coli* S17-1 strains (ATCC47055). The obtained *E. coli* strains and KNK005 strains (see U.S. Pat. No. 7,384,766) were subjected to mixed culture on a Nutrient Agar medium (manufactured by Difco Inc.) to conjugate them. The KNK005 strain was a strain which introduced a gene coding PHA synthase having an amino acid sequence represented by SEQ NO. 19 in the sequence table to a *Cupriavidus* necator 1-116 strain.

The culture medium was seeded in Simmons agar medium (sodium citrate 2 g/L, sodium chloride 5 g/L, magnesium sulfate.7hydrate 0.2 g/L, ammonium dihydrogen phosphate 1 dipotassium hydrogen phosphate 1 g/L, and agar 15 g/L, pH 6.8) containing 250 mg/L of kanamycin, and strains grown on the agar medium were selected, thereby obtaining strains in which the plasmids were inserted onto chromosomes of the KNK005 strains. After the strains were subjected to second generation cultivation in a Nutrient Broth medium (manufactured by Difco Inc.), the obtained strains were diluted and coated on Nutrient Agar medium containing 15% saccharose, and grown strains were obtained as strains which were sloughed from the plasmids.

One strain having a deletion from a start codon to a stop codon of the phaZ6 genes on the chromosome was isolated from the obtained strains according to the analysis by PCR, and the obtained gene disruption strain was designated as "KNK005 ΔphaZ6 strain." Further, a chromosome gene disruption strain KNK005 ΔphaZ2,6 strain with a deletion from a start codon to a stop codon of the phaZ6 gene on the chromosome and further a deletion from the 16th codon to the stop codon on the phaZ2 gene was produced in the same manner as above, using pNS2X-phaZ2(−+), with a KNK005.phaZ6 strain being a parent strain. Furthermore, a gene disruption strain KNK005 ΔphaZ1,2,6 strain with a deletion from a start codon to a stop codon of the phaZ6 gene and further a deletion from the 16th codon to the stop codon on the phaZ2 gene was produced in the same manner as above, using pNS2X-phaZ1(−+), with a KNK005 ΔphaZ2,6 strain being a parent strain.

Next, a promoter and a plasmid for inserting Shine-Dalgarno sequence (SD sequence) were produced. PCR was performed using genome DNA of *C. necator* H16 strain as a template, and primers represented by SEQ NO. 13 and SEQ NO. 14. In addition, PCR was performed in the same conditions as above using primers represented by SEQ NO. 15 and SEQ NO. 16. Furthermore, PCR was performed in the same conditions as above using plasmid pKK388-1 (manufactured by Clontech Laboratories, Inc.) as a template and primers represented by SEQ NO. 17 and SEQ NO. 18.

PCR was performed in the same conditions as above using the three kinds of the DNA fragments obtained in the PCRs above as templates, and using primers represented by SEQ NO. 13 and SEQ NO. 16. The obtained DNA fragment was digested with restriction enzyme SwaI. The DNA fragment was linked to vector pNS2X-sacB, described in JP-A No. 2007-259708, which was SwaI-digested, with DNA ligase (Ligation High, manufactured by Toyobo Co., Ltd.), thereby producing a plasmid vector for inserting DNA, p-NS2X-sacB+phaJ4bU-trc-phaJ4b, having a base sequence having a region upstream the phaJ4b structural gene, the trc promoter, the phaC1SD sequence, and the phaJ4b structural gene.

Next, a promoter and SD sequence-inserted strain were produced. The promoter and the plasmid vector for inserting SD sequence, pNS2X-sacB+phaJ4bU-trc-phaJ4b, were introduced into *E. coli* S17-1 strains (ATCC47055) by transformation. The obtained *E. coli* strains and the KNK005 ΔphaZ1,2,6 strains were subjected to mixed culture on a Nutrient Agar medium (manufactured by Difco Inc.) to conjugate them.

The culture medium was seeded in Simmons agar medium (sodium citrate 2 g/L, sodium chloride 5 g/L, magnesium sulfate.7hydrate 0.2 g/L, ammonium dihydrogen phosphate 1 g/L, dipotassium hydrogen phosphate 1 g/L, and agar 15 g/L, pH 6.8) containing 250 mg/L of kanamycin, and strains grown on the agar medium were selected, thereby obtaining strains in which the plasmids were inserted onto chromosomes of the KNK005 ΔphaZ1, 2,6 strains. After the strains were subjected to second generation cultivation in a Nutrient Broth medium (manufactured by Difco Inc.), the obtained strains were diluted and coated on Nutrient Agar medium containing 15% saccharose, and grown strains were obtained as strains which were sloughed from the plasmids.

Further, one strain, in which a DNA fragment having an expression regulatory sequence containing a trc promoter and a phaC1SD sequence, which was represented by SEQ NO. 20, was inserted at the upstream side of phaJ4b structural gene on the chromosome, was isolated according to the analysis by PCR. The obtained promoter and SD sequence-inserted strain were designated as KNK005 trc-phaJ4b ΔphaZ1,2,6 strain. PHA-1 was obtained as poly(3-hydroxybutyrate-co-3-hydroxyhexanoate) in the same manner as in Synthetic Example 2 using the obtained KNK005 trc-phaJ4b ΔphaZ1,2,6 strain. In Synthetic Example 4, P3HB3HH (PHA-1) having a 3HB ratio of 80% by mole, and a weight average molecular weight of 520,000 was obtained.

The molar ratios of 3-hydroxybutyrate (3HB) and the weight average molecular weights of PHA-1 to -4, obtained in Synthetic Examples 1 to 4 are shown in Table 1.

Synthetic Examples 5 to 7

Synthesis of poly[(3-hydroxybutyrate)-co-(4-hydroxybutyrate)] (P3HB4HB)

Three kinds of P3HB4HB (PHA-5 to -7) were synthesized according to a method described in JP-B No. H08-19227 using, as a producing strain, Ralstonia Eutropha H16 (ATCC17699, a former name: Alcaligenes Eutrophus H16).

First, the strains were seeded in a medium in which 10 g of a yeast extract, 10 g of polypeptone, 5 g of a meat extract, and 5 g of ammonium sulfate were dissolved in one liter of water and whose pH was 7, and it was cultured at 30° C. The strains were fractionated from the obtained culture medium by centrifugation. The obtained strains were seeded in an amount of 5 g based on one liter of a medium (pH 7) for synthesizing P3HB4HB, which was cultured at 30° C. for 48 hours, thereby obtaining a culture medium containing strains which accumulated P3HB4HB (PHA-5 to -7). As the medium for synthesizing P3HB4HB, three kinds of media were used which were obtained by adding, as a carbon source, 5 parts of a mixture of 2% by mole of γ-butyrolactone and 98% by mole of saccharose (Synthetic Example 5), a mixture of 3% by mole of γ-butyrolactone and 97% by mole of saccharose (Synthetic Example 6), or a mixture of 5% by mole of γ-butyrolactone and 95% by mole of saccharose (Synthetic Example 7) to 95 parts of a solution in which 39 nil of a 0.5 M aqueous potassium hydrogen phosphate solution, 53.6 ml of a 0.5 M aqueous dipotassium hydrogen phosphate solution, 1 ml of a 20 w/v % aqueous magnesium sulfate solution, and 1 ml of an mineral aqueous solution (Co, Fe, Ca, Ni, Cr, Ca, and the like) were dissolved in one liter of deionized water.

Each strain, obtained as above, was centrifuged, washed with distilled water and acetone in this order, and dried in a reduced pressure to obtain a dry strain. P3HB4HB was extracted with hot chloroform from the dry strain, hexane was added to the obtained extract to precipitate P3HB4HB, and the precipitate was filtered and dried to obtain a polymer preparation, P3HB4HB, as PHA-5 (Synthetic Example 5), PHA-6 (Synthetic Example 6), or PHA-7 (Synthetic Example 7). The molar ratios of 3-hydroxybutyrate (3HB) and the weight average molecular weights of these polymers were shown in Table 2.

Synthetic Examples 8 to 12

Synthesis of (Meth)acrylate Resin by Emulsion Polymerization

In a pressure-resistant polymerization vessel equipped with a thermometer, a stirrer, a reflux condenser, a nitrogen-introducing inlet, and a devise of adding monomers and emulsifiers were put deionized water and sodium lauryl sulfate, and the mixture was heated to 70° C. in nitrogen stream while it was stirred, to which potassium persulfate was added. After 30 minutes, deoxygenation under decompression and pressurization with nitrogen were performed to have an appropriate dissolved oxygen concentration. After that, a monomer mixture described in Table 2 was added at a rate of 25 parts/hour. In addition, 0.3 parts of sodium lauryl sulfate was added after 60 minutes, 120 minutes, and 240 minutes from the start of the addition of the monomer mixture. After the addition of the monomer mixture was finished, the stirring was continued for one hour, and then 0.1 parts of sodium formaldehyde sulfoxylate and 0.1 parts of tert-butyl peroxide were added. After that, the stirring was continued for one hour to obtain (meth)acrylate resin latex. The solid concentration of the obtained latex was adjusted to 40%. The number average primary particle size and the weight average molecular weight of the (meth)acrylate resin were adjusted to values described in Table 2, by controlling the initial amount (parts) of the sodium lauryl sulfate added, the amount of the potassium persulphate added, and the dissolved oxygen concentration, and if necessary, adding tert-dodecyl mercaptan (a chain-transfer agent) to the monomer mixture.

The latex having a solid concentration of 40%, obtained as above, was coagulated with calcium chloride, granulated, dehydrated, and dried to prepare a white powdery (meth)acrylate resin. A theoretical glass transition temperature, a number average particle size, a number average molecular weight, and a monomer composition of each of the (meth)acrylate resins obtained are shown in Table 2.

Synthetic Example 13

Synthesis of (Meth)acrylate Resin by Suspension Polymerization

In a pressure-resistant polymerization vessel equipped with a thermometer, a stirrer, a reflux condenser, a nitrogen-introducing inlet, and a devise of adding monomers and emulsions were put deionized water and 0.4 parts of tricalcium diphosphate, and the mixture was heated to 40° C. in nitrogen stream while it was stirred. After 30 minutes, deoxygenation under decompression and pressurization with nitrogen were performed to have an appropriate dissolved oxygen concentration. After that, 100 parts of a solution in which dilauroyl peroxide was dissolved in a monomer mixture described in Table 2 was added thereto. After that, the stirring was continued for 30 minutes, to which 0.25 parts of polyvinyl alcohol was added, and the stirring was continued for 30 minutes at the appropriate number of stirrings so as to obtain an appropriate liquid droplet particle size. After that, the generation of heat and the increase of a conversion, due to the gel effect, were confirmed, and then the polymerization temperature was risen to 80° C. and the stirring was continued until the conversion reached 97% or more, thereby obtaining a dispersion of a (meth)acrylate resin. The solid concentration of the dispersion was adjusted to 30%. In addition, the weight average molecular weight was adjusted to values described in Table 2 by controlling the dissolved oxygen concentration and the amount (parts) of the lauroyl peroxide added, and adding tert-dodecyl mercaptan (a chain-transfer agent) to the monomer mixture, and the number average primary particle size was adjusted to a value described in Table 2 by controlling the number of stirrings. The obtained dispersion was dehydrated and dried to obtain a white powdery (meth)acrylate resin. A theoretical glass transition temperature, a number average particle size, a number average molecular weight, and a monomer composition of the (meth)acrylate resins obtained are shown in Table 2.

The meaning of abbreviations of the (meth)acrylate resin in Table 2 is explained based on the abbreviation "N220-57-0.3" of the methacrylate resin obtained in Synthetic Example 8. The abbreviation is formed of "N" which is a capital letter of the alphabet in a first position, "220" in a second position. "57" in a third position, and "0.3" in a fourth position. The first position shows a polymerization method, and N shows an emulsion polymerization. In addition, there is also "K: suspension polymerization product" as the (meth)acrylate resin obtained in Synthetic Example 13. The second position shows a weight average molecular weight in terms of the polystyrene (unit: 0,000). The third position shows a glass transition temperature (unit: ° C.). The fourth position shows a number average primary particle size (unit: μm). As described above, the main properties of the (meth)acrylate resin can be revealed from its abbreviation.

Example 1

(1) Preparation Step of Vinyl Chloride Resin Compound 100 parts of a vinyl chloride resin was 4000 g. Into a Henschel mixer (Super Mixer SM, V20, manufactured by Kawata Mfg Co., Ltd.) was charged 100 parts of a vinyl chloride resin (MB1008) described in Table 1, into which 2.0 parts of a butyltin-containing sulfur stabilizer (trade name: TVS #1360, manufactured by Nitto Kasei Co., Ltd.) was charged over one minute in a low speed stirring mode. After that, steam was introduced into a jacket of the mixer, and a high speed stirring mode was started. When the compound temperature reached 60° C., the stirring was once suspended, and 0.4 parts of a high molecular composite ester outer lubricant (trade name: Loxiol G70S manufactured by BASF Japan Co., Ltd.) and 0.5 parts of a polyol ester inner lubricant (trade name: Loxiol GH4, manufactured by BASF Japan Co., Ltd.) were charged into it. The high speed stirring mode was started again, and when the compound temperature reached 90° C., the stirring was once suspended and 1.0 part of a (meth)acrylate resin (N220-57-0.3) described in Table 2 was charged into it. Again, the high speed stirring mode was started, and when the compound temperature reached 105° C., the stirring was stopped. After that, the introduction of the steam to the jacket was stopped, water was introduced to the jacket of the mixer, and the low speed stirring mode was started. The cooling was continued until the compound temperature reached 80° C., and an outlet was opened and a compound was recovered.

(2) Preparation Step of Polyhydroxyalkanoate Compound 100 parts of polyhydroxyalkanoate was 4000 g. Into a Henschel mixer were charged 100 parts of a polyhydroxyalkanoate (PHA-2) described in Table 1, 0.4 parts of a high molecular composite ester outer lubricant (Loxiol G70S), 0.5 parts of a polyol ester inner lubricant (Loxiol GH4), and 1.0 part of a (meth)acrylate resin (N220-57-0.3) described in Table 2, and the stirring and mixing were performed at room temperature over one minute in a high speed stirring mode. After that, an outlet was opened, thereby preparing a polyhydroxyalkanoate compound.

(3) Roll Forming Step

The total amount of 100 parts of the vinyl chloride resin and the polyhydroxyalkanoate was 150 g. A test roll formed of a 8 inch-front roll and a 8 inch-back roll was used, and a roll temperature was set at 160° C., as described in Table 3. This roll temperature was a temperature at which the vinyl chloride resin compound was twined around the roll in 30 seconds and a molded article was removed from the roll without any problem after finishing of the roll formation. The vinyl chloride resin compound containing 20 parts of the vinyl chloride resin was charged into the roll over 20 seconds under conditions that the number of revolutions of the front roll was 18 rpm and the number of revolutions of the back roll was 15 rpm. After the vinyl chloride resin compound was twined around the roll, it was kneaded for 2 minutes. After that, the polyhydroxyalkanoate compound containing 80 parts of the polyhydroxyalkanoate was charged over 20 seconds, and the kneading was performed for 4 minutes by width-aligning a sheet-like melted article, which was twined around the roll, from both right and left sides toward the center using a bamboo stick. After 12 seconds from the completion of the kneading, the roll was stopped, and the molded article was cut into a sheet, which was naturally cooled, thereby obtaining a sheet-like molded article having a thickness of 0.3 mm.

(4) Press-Forming Step

The sheet-like molded article, obtained by the roll-forming, was cut into multiple sheets, and they were put on top of each other, which was put between heating presses whose temperature was set at a temperature 5° C. higher than the roll temperature in the roll-forming described above, and it was pre-heated for 8 minutes. The pressure thereof was increased to 50 MPa for 30 seconds, and was kept as it was for 2 minutes. After that, the pressure was released, and, immediately after, the pressed product was inserted into a cooling press machine. A pressure of 50 MPa was applied thereto, and it was cooled as it was for 15 minutes, thereby obtaining a sheet-like molded article having a thickness of 1.0 mm. The obtained molded article was subjected to a measurement of each physical property.

Examples 2 to 5 and Comparative Examples 1 to 5

Sheet-like molded articles having a thickness of 1.0 mm were obtained, and they were subjected to the measurement of each physical property in the same manner as in Example 1, except that the blending ratio of the vinyl chloride resin (MB1008) and the polyhydroxyalkanoate (PHA-2), the roll temperature in the roll forming step, and the press temperature in the press-forming step were changed to values shown in Table 3.

Examples 6 to 8 and Comparative Examples 6 to 10

In the roll forming step, 5 parts (Example 6), 10 parts (Example 7), or 15 parts (Example 8), the parts being based on the total amount 100 parts of the vinyl chloride resin and the polyhydroxyalkanoate, of a glycerol plasticizer (trade name: RIKEMAL PL012, manufactured by Riken Vitamin Co., Ltd.) was added to a vinyl chloride resin compound containing 60 parts of the vinyl chloride resin, and they were added and mixed to prepare a vinyl chloride resin-containing compound. Sheet-like molded articles of Examples 6 to 8, having a thickness of 1.0 mm, were obtained in the same manner as in Example 5, except that the vinyl chloride resin-containing compounds were used instead of the vinyl chloride resin compound, and the roll temperature in the roll forming step and the press temperature at the press-forming were changed to temperatures shown in Table 4. Molded articles of Comparative Examples 6 to 10, having a thickness of 1.0 mm were obtained in the same manner as in Comparative Example 5, and they were subjected to the measurement of each physical property. The results from Example 5 and Comparative Example 5 are provided again in Table 4. Form these results, it is found that the tensile elasticity of 1000 MPa or less and the tensile elongation of 100% or more which is defined as the soft thermoplastic resin in the present invention, can be shown within the range of the present invention, and the moldability with no problem Δ or more) and the reduced plasticizer migration (3 or more) can be realized.

Comparative Examples 5 to 10 in Table 4 show examples in which the plasticizer was added to the vinyl chloride resin without polyhydroxyalkanoate. It is found that either of the tensile elasticity of 1000 MPa, the tensile elasticity of 100% or more, and the reduced plasticizer migration (3 or more) cannot be obtained.

Examples 9 to 13 and Comparative Examples 11 to 13

Sheet-like molded articles having a thickness of 1.0 mm were obtained and they were subjected to the measurement of each property in the same manner as in Example 5, except that the blending ratio (parts) of the (meth)acrylate resin was changed to values described in Table 5 and, in Examples 11 to 13 and Comparative Example 13, N100-57-0.3, obtained in Synthetic Example 9, was used as the (meth)acrylate resin, instead of N220-57-0.3.

Examples 14 to 16 and Comparative Examples 14 to 18

Sheet-like molded articles having a thickness of 1.0 mm were obtained and they were subjected to the measurement of each property in the same manner as in Example 5, except that, as the (meth)acrylate resin, instead of N220-57-0.3, N100-105-0.3 (Examples 14 to 16 and Comparative Example 14) obtained in Synthetic Example 10, N12-57-0.3 (Comparative Examples 15 and 16) obtained in Synthetic Example 12, or K100-57-50 (Comparative Examples 17 and 18) obtained in Synthetic Example 13 was used, and the blending ratio (parts) of the (meth)acrylate resin was changed to values described in Table 6.

Examples 17 and 18 and Comparative Examples 19 and 20

Sheet-like molded articles having a thickness of 1.0 mm was obtained, and they were subjected to the measurement of each property in the same manner as in Example 4, except that the blending ratio (parts) of the (meth)acrylate resin (N220-57-0.3) was changed to values described in Table 7, and the roll temperature 170° C. in the roll forming step and the press temperature 175° C. in the press-forming step were changed to 165° C. and 170° C., respectively.

Examples 19 to 21 and Comparative Examples 21 and 22

Sheet-like molded articles having a thickness of 1.0 mm were obtained and they were subjected to the measurement of each property in the same manner as in Example 7, except that the blending ratio (parts) of the (meth)acrylate resin (N220-57-0.3) was changed to values described in Table 7, and the roll temperature 165° C. in the roll forming step and the press temperature 170° C. in the press-forming step were changed to 160° C. and 165° C., respectively.

Examples 22 to 24

Sheet-like molded articles having a thickness of 1.0 mm were obtained and they were subjected to the measurement of each property in the same manner as in Example 4, except that PHA-1 (Example 22), PHA-3 (Example 23), or PHA-4 (Example 24) was used as the polyhydroxyalkanoate, instead of PHA-2, as shown in Table 8. In Table 8, Example 4 was provided again.

Examples 25 to 27

Sheet-like molded articles having a thickness of 1.0 mm were obtained and they were subjected to the measurement of each property in the same manner as in Example 5, except that PHA-5 (Example 25), PHA-6 (Example 26), or PHA-7 (Example 27) was used as the polyhydroxyalkanoate, instead of PHA-2, as shown in Table 8. In Table 8, Example 5 was provided again.

Examples 28 to 30 and Comparative Example 23

Sheet-like molded articles having a thickness of 1.0 mm were obtained and they were subjected to the measurement of each property in the same manner as in Example 5, except that S1008 (Example 28), S1001 (Example 29), S1003 (Example 30), or KS2500 (Comparative Example 23) was used as the vinyl chloride resin, instead of MB1.008, as shown in Table 9, and the roll temperature in the roll forming step and the press temperature in the press-forming step were changed to temperatures described in Table 9. In Table 9, Example 5 was provided again.

Examples 31 and 32

Sheet-like molded articles having a thickness of 1.0 mm were obtained and they were subjected to the measurement of each property in the same manner as in Example 5, except that, in the roll forming step, a vinyl chloride resin compound containing 60 parts of a vinyl chloride resin and a polyhydroxyalkanoate compound containing 40 parts of polyhydroxyalkanoate were charged into a plastic bag, the bag was vibrated for 60 seconds with hands at a rate of three times per second, the obtained blend was charged into the roll over 40 second, and it was kneaded for 6 minutes.

Tables 5 to 7 show examples in which the kind and addition amount (parts) of the (meth)acrylate resin in Comparative Examples 11 to 22, Example 5, and Examples 9 to 21 are changed. From these results, it is found that the processability with no problem can be obtained, and the tensile elasticity of 1000 MPa or less, the tensile elongation of 100% or more, and the excellent reduced plasticizer migration (3 or more) are shown within the range of the present invention.

In Example 4, Example 5, and Examples 22 to 27 in Table 8, the kind of the polyhydroxyalkanoate and the copolymerization composition ratio were changed. In addition, in Example 5, Examples 28 to 30, and Comparative Example 23 in Table 9, the degree of polymerization of the vinyl chloride resin was changed, and further in Example 5, Example 28, Example 31, and Example 32 in Table 9, the molding method was changed. It is found that the tensile elasticity of 1000 MPa or less, the tensile elongation of 100% or more, and the excellent reduced plasticizer migration (3 or more) are shown within the range of the present invention.

Examples 33 to 36 and Examples 39 and 40

(1) Preparation Step of First Stage Compound 100 parts was 4000 g. To a Henschel mixer (Super Mixer SM V20, manufactured by Kawata Mfg Co., Ltd.) was charged 60 parts of a vinyl chloride resin (S1001, S1008, or MB1008) described in Table 10, into which 3.0 parts of a barium-zinc stabilizer (trade name: AC-186, manufactured by ADEKA Corporation) was charged over one minute in a low speed stirring mode. After that, steam was introduced into a jacket of the mixer, and a high speed stirring mode was started. When the compound temperature reached 60° C., the stirring was once suspended, and 0.4 parts of a high molecular composite ester outer lubricant (trade name: Loxiol G70S, manufactured by BASF Japan Co., Ltd.) and 0.5 parts of erucic acid amide (trademark: NEUTRON-S, manufactured by Nippon Fine Chemical Co., Ltd.) were charged into it. The high speed stirring mode was started again, and when the compound temperature reached 90° C., the stirring was once suspended and 3.0 parts of a (meth)acrylate resin (N220-57-0.3) and polyhydroxyalkanoate (PHA-2), which was used as the first stage compound, described in Table 10, were charged into it. Again, the high speed stirring mode was started, and when the compound temperature reached 105° C., the stirring was stopped. After that, the introduction of the steam to the jacket was stopped, water was introduced to the jacket of the mixer, and the low speed stirring mode was started. The cooling was continued until the compound temperature reached 80° C., and an outlet was opened and a first stage compound was recovered.

(2) Pre-Kneading Step (Preparation Step of Second Stage Compound)

A mixer with an air cooling function (trade name: Roller Mixer R60 Model, manufactured by Toyo Seiki Seisaku-Sho Ltd.) was attached to a kneading evaluation machine (trade name: Labo Plasto Mill C, Type: Model 50C 150, manufactured by Toyo Seiki Seisaku-Sho Ltd.), which was used as a small-sized machine of a Banbury mixer. 100 parts was 66 g. The mixer temperature of the machine was adjusted to 100° C., and the whole amount of the first stage compound, obtained as above, was charged to the machine while inching was performed. After the completion of the charging, pre-heating was performed for one minute, and rotation of roller was started. After the starting of the rotation, the number of revolutions was increased to 100 rpm over one minute, and then the number of revolutions was kept at 100 rpm. When a resin thermometer showed 155° C., the rotation was once stopped, and polyhydroxyalkanoate (PHA-2), which was used as the second stage compound, was charged while the inching was performed. After that, the rotation was started again at a rate of 100 rpm, and a compound after the pre-kneading was discharged at a stage at which the resin thermometer showed 155° C. again. The operation described above was performed using the three same machines, which were aligned in parallel, thereby obtaining 198 g, corresponding to 3 times amount of 66 g, of the second stage compound.

(3) Roll Forming Step 1

A test roll formed of a 8 inch-front roll and a 8 inch-back roll was used as a mixing roll, and the number of revolutions of the front roll was adjusted to 25 rpm, the number of revolutions of the back roll was adjusted to 23 rpm, and a space between the rolls was adjusted to 0.5 mm. A roll temperature was set at 165° C. (Example 40), 170° C. (Example 39), or 175° C. (Examples 33 to 37), as described in Table 10. The second stage compound, obtained in the pre-kneading step, was charged into the roll after one minute from the completion of the pre-kneading step to wind it around the roll, and kneading was performed for 3 minutes by width-aligning a sheet-like melted article from both right and left sides toward the center using a bamboo stick. After that, while the width-aligning was continued, a 3 cm-central part was cut into "strip" and it was continuously transported to a roll forming step 2.

(4) Roll Forming Step 2

The same test roll as used in (3) was used as a calendar roll, and the numbers of the revolutions were adjusted as the same as (3). The roll temperature was adjusted to a temperature of the roll temperature in the roll forming step 1-10° C., as described in Table 10, the melted resin "strip," transported from the roll forming step 1, was twined around the roll, and a space between the rolls was adjusted so that a thickness of a sheet was 0.15 mm. After that, the sheet-like melted product was cut into to obtain a sheet-like molded article.

(5) Press-Forming Step

The step was performed in the same manner as in Example 1.

(6) Evaluation

An adhesion to roll, a transportability of melted resin, and a transparency were evaluated based on the following criteria. The air mark, the flow mark, and the particle were evaluated in the same manner as in Example 1, and the tensile test and the plasticizer igration test were performed in the same manner as in Example 1 except that "0.15 mm-sheet-like molded article obtained in Roll Forming Step 2" was used instead of the "sheet-like molded article having a thickness of 1.0 mm obtained in the press-forming."

<Transportablity of Melted Resin>

The transportablity of melted resin is an indicator of an easiness of transportation when the melted resin "strip" cut in the forming step 1 is transported to the roll forming step 2.

⊚: The melted resin had appropriate melt-viscosity and melt tension, and there was no problem in the transportation.

○: The melted resin was lower in the melt-viscosity and the melt tension, but the transportation could be done.

Δ: The melted resin was too low in the melt-viscosity and the melt tension, but the transportation could be managed.

x: The melted resin was so low in the melt-viscosity and the melt tension that the melted resin "strip" was too much elongated, and it was difficult to transport.

<Adhesion to Roll>

The adhesion to roll is an indication of easiness of the removal from the metal surface of the roll when the sheet-like melted resin was cut in the roll forming step 2.

⊚: The sheet-like melted resin was removed without any resistance.

○: The sheet-like melted resin was removed without any problem.

Δ: The sheet-like melted resin was removed, although there were some resistances.

x: The sheet-like melted resin adhered to the metal surface of the roll, and could not be removed.

<Transparency>

○: The sheet-like molded article was colorless and transparent, and a background can be clearly seen.

Δ: The sheet-like molded article was somehow transparent, and a background is seen unclearly.

x: The sheet-like molded, article was clouded, and it is difficult to see a background.

Examples 37 and 38

Sheet-like molded articles were produced and the evaluations thereof were performed in the same manner as in Example 33, except that vinyl chloride resins described in Table 10 were used, the roll temperature and the press temperature were adjusted to temperatures described in Table 10, and the pre-kneading step (2) (the preparation step of second stage compound) was performed as follows.

(2) Pre-Kneading Step

A small-sized machine of a Banbury mixer, which was the same as in Example 33, was used. 100 parts was 66 g. A mixer temperature of the machine was adjusted to 100° C., and the whole amount of a first stage compound was charged while inching was performed. After the completion of the addition, pre-heating was performed for one minute, and the rotation of the roller was started. After the rotation was started, the number of revolutions was increased to 100 rpm over one minute and then rotation was kept at 100 rpm. However, a resin thermometer did not reach 155° C. even after 10 minutes. Subsequently, the second stage compound, polyhydroxyalkanoate (PHA-2), was charged. After that, the rotation was started at 100 rpm again, and a second stage compound was discharged at a stage at which the resin thermometer showed 155° C. again. The operation described above was performed using the three same machines, which were aligned in parallel, thereby obtaining 1.98 g, corresponding to 3 times amount of 66 g, of the compound after the pre-kneading.

In comparison of Examples 33 to 37, the sheet-like molded articles having both of the physical properties and the moldability at high levels can be obtained by the addition of 5 to 30 parts (12.5 to 75% of the whole blending amount) of polyhydroxyalkanoate to the first stage compound. It is found from the comparison of Example 35 and Examples 38 to 40 that the vinyl chloride resin, which is the homopolymer, and has a degree of polymerization of 750 or more and 1200 or less, particularly 900 to 1200 is good.

TABLE 1

| Product name | Abbreviation | Name | Maker | Detail |
| --- | --- | --- | --- | --- |
| Kanevinyl MB 1008 | MB1008 | Vinyl chloride resin | Kaneka Corporation | Degree of polymerization ≈ 680, Copolymer Vinyl acetate content = 10% by weight |
| Kanevinyl S1008 | S1008 | Vinyl chloride resin | Kaneka Corporation | Degree of polymerization ≈ 800, Homopolymer |
| Kanevinyl S1001 | S1001 | Vinyl chloride resin | Kaneka Corporation | Degree of polymerization ≈ 1050, Homopolymer |
| Kanevinyl S1003 | S1003 | Vinyl chloride resin | Kaneka Corporation | Degree of polymerization ≈ 1300, Homopolymer |
| Kanevinyl KS2500 | KS2500 | Vinyl chloride resin | Kaneka Corporation | Degree of polymerization ≈ 2500, Homopolymer |
| Synthesis Example 1 | PHA-2 | Polyhydroxyalkanoate | Kaneka Corporation | P3HB3HH[1] Ratio of 3HB[3] = 87% by mole, Weight average molecular weight = 550,000 |
| Synthesis Example 2 | PHA-3 | Polyhydroxyalkanoate | Kaneka Corporation | P3HB3HH[1] Ratio of 3HB[3] = 89% by mole, Weight average molecular weight = 500,000 |
| Synthesis Example 3 | PHA-4 | Polyhydroxyalkanoate | Kaneka Corporation | P3HB3HH[1] Ratio of 3HB[3] = 94% by mole, Weight average molecular weight = 490,000 |
| Synthesis Example 4 | PHA-1 | Polyhydroxyalkanoate | Kaneka Corporation | P3HB3HH[1] Ratio of 3HB[3] = 80% by mole, Weight average molecular weight = 520,000 |
| Synthesis Example 5 | PHA-5 | Polyhydroxyalkanoate | Kaneka Corporation | P3HB4HB[2] Ratio of 3HB[3] = 92% by mole, Weight average molecular weight = 710,000 |
| Synthesis Example 6 | PHA-6 | Polyhydroxyalkanoate | Kaneka Corporation | P3HB4HB[2] Ratio of 3HB[3] = 86% by mole, Weight average molecular weight = 1,010,000 |
| Synthesis Example 7 | PHA-7 | Polyhydroxyalkanoate | Kaneka Corporation | P3HB4HB[2] Ratio of 3HB[3] = 79% by mole, Weight average molecular weight = 990,000 |

[1] P3HB3HH: Poly(3-hydroxybutyrate)-co-(3-hydroxyhexanoate)
[2] P3HB4HB: Poly(3-hydroxybutyrate)-co-(4-hydroxybutyrate)
[3] 3HB: 3-Hydroxybutyrate

TABLE 2

| Product name | Abbreviation | Name | Maker | Detail |
| --- | --- | --- | --- | --- |
| Synthesis Example 8 | N220-57-0.3 | Methacrylate resin | Kaneka Corporation | Emulsion polymerization product, Theoretical Tg = 57° C., Number average particle size = 0.3 μm, Molecular weight = 2,200,000, Composition MMA/BA = 80/20[4] |
| Synthesis Example 9 | N100-57-0.3 | Methacrylate resin | Kaneka Corporation | Emulsion polymerization product, Theoretical Tg = 57° C., Number average particle size = 0.3 μm, Molecular weight = 1,000,000, Composition MMA/BA = 80/20[4] |

TABLE 2-continued

| Product name | Abbreviation | Name | Maker | Detail |
|---|---|---|---|---|
| Synthesis Example 10 | N100-105-0.3 | Methacrylate resin | Kaneka Corporation | Emulsion polymerization product, Theoretical Tg = 105° C., Number average particle size = 0.3 μm, Molecular weight = 1,000,000, Composition MMA/BA = 100/0[4] |
| Synthesis Example 11 | N100-135-0.3 | Methacrylate resin | Kaneka Corporation | Emulsion polymerization product, Theoretical Tg = 135° C., Number average particle size = 0.3 μm, Molecular weight = 1,000,000, Composition MMA/MAA = 70/30[4] |
| Synthesis Example 12 | N12-57-0.3 | Methacrylate resin | Kaneka Corporation | Emulsion polymerization product, Theoretical Tg = 57° C., Number average particle size = 0.3 μm, Molecular weight = 120,000, Composition MMA/BA = 80/20[4] |
| Synthesis Example 13 | K100-57-50 | Methacrylate resin | Kaneka Corporation | Suspension polymerization product, Theoretical Tg = 57° C., Number average particle size = 50 μm, Molecular weight = 1,000,000, Composition MMA/BA = 80/20[4] |
| TVS# 1360 | TVS#1360 | Butyltin-containing sulfur stabilizer | Nitto Kasei Co., Ltd. | Pale yellow liquid, Refractive index = 1.502 to 1.508, Specific gravity = 1.118 to 1.138 (quoted from a maker's catalog) |
| Loxiol G70S | G70S | High molecular composite ester outer lubricant | BASF Japan Co., Ltd | Solid, Coagulation point: 55 to 58° C. (quoted from a maker's catalog) |
| Loxiol GH4 | GH4 | Polyol ester inner lubricant | BASF Japan Co., Ltd | Solid, Coagulation point: 75 to 80° C. (quoted from a maker's catalog) |
| Rikemal PL012 | PL012 | Glycerol plasticizer | Riken Vitamin Co., Ltd. | Glycerol diacetomonolaurate, Pale yellow liquid, Degree of acetylation ? 95% (quoted from a maker's catalog) |

[4]MMA: Methyl methacrylate,
BA: Butyl acrylate,
MAA, Methacrylic acid

TABLE 3

| | Item | | Comparative Example 1 | Example 1 | Example 2 | Example 3 | Example 4 | Example 5 | Comparative Example 2 | Comparative Example 3 | Comparative Example 4 | Comparative Example 5 |
|---|---|---|---|---|---|---|---|---|---|---|---|---|
| Blending | Vinyl chloride resin | Product name | | MB1008 | MB1008 | MB1008 | MB1008 | MB1008 | MB1008 | MB1008 | MB1008 | MB1008 |
| | | parts | 0.0 | 20.0 | 30.0 | 40.0 | 50.0 | 60.0 | 70.0 | 80.0 | 90.0 | 100.0 |
| | Polyhydroxyalkanoate | Product name | PHA-2 | PHA-2 | PHA-2 | PHA-2 | PHA-2 | PHA-2 | PHA-2 | PHA-2 | PHA-2 | |
| | | parts | 100.0 | 80.0 | 70.0 | 60.0 | 50.0 | 40.0 | 30.0 | 20.0 | 10.0 | 0.0 |
| | (Meth)acrylate resin | Product name | N220-57-0.3 | N220-57-0.3 | N220-57-0.3 | N220-57-0.3 | N220-57-0.3 | N220-57-0.3 | N220-57-0.3 | N220-57-0.3 | N220-557-0.3 | N220-57-0.3 |
| | | parts | 1.0 | 1.0 | 1.0 | 1.0 | 1.0 | 1.0 | 1.0 | 1.0 | 1.0 | 1.0 |
| | Plasticizer | Product name | | | | | | | | | | |
| | | parts | 0.0 | 0.0 | 0.0 | 0.0 | 0.0 | 0.0 | 0.0 | 0.0 | 0.0 | 0.0 |
| Molding | Roll temperature | ° C. | 150 | 160 | 165 | 165 | 170 | 170 | 170 | 170 | 170 | 170 |
| | Press temperature | ° C. | 155 | 165 | 170 | 170 | 175 | 175 | 175 | 175 | 175 | 175 |
| Physical property | HAZE | % | 65.4 | 36.2 | 29.8 | 8.7 | 3.2 | 3.1 | 2.2 | 2.3 | 2.6 | 2.8 |
| | Tensile breaking stress | MPa | 11 | 20 | 8 | 13 | 28 | 27 | 71 | 81 | 70 | 31 |
| | Tensile break elongation | % | 64 | 764 | 576 | 442 | 324 | 312 | 5 | 6 | 5 | 32 |
| | Tensile elasticity | MPa | 472 | 437 | 17 | 45 | 259 | 735 | 1992 | 1890 | 1853 | 1885 |
| | Plasticizer migration | Rank | 4 | 4 | 4 | 4 | 4 | 4 | 4 | 4 | 4 | 4 |
| Moldability | Air mark | Rank | Δ | Δ | Δ | Δ | Δ | Δ | Δ | Δ | Δ | Δ |
| | Flow mark | Rank | ○ | ○ | ○ | ○ | ○ | ○ | ○ | ○ | ○ | ○ |
| | Particle | Rank | ○ | ○ | ○ | ○ | ○ | ○ | ○ | ○ | ○ | ○ |

TABLE 4

| | Item | | Example 5 | Example 6 | Example 7 | Example 8 | Comparative Example 5 | Comparative Example 6 | Comparative Example 7 | Comparative Example 8 | Comparative Example 9 | Comparative Example 10 |
|---|---|---|---|---|---|---|---|---|---|---|---|---|
| Blending | Vinyl chloride resin | Product name | MB1008 | MB1008 | MB1008 | MB1008 | MB1008 | MB1008 | MB1008 | MB1008 | MB1008 | MB1008 |
| | | parts | 60.0 | 60.0 | 60.0 | 60.0 | 100.0 | 100.0 | 100.0 | 100.0 | 100.0 | 100.0 |

TABLE 4-continued

| | Item | | Example 5 | Example 6 | Example 7 | Example 8 | Comparative Example 5 | Comparative Example 6 | Comparative Example 7 | Comparative Example 8 | Comparative Example 9 | Comparative Example 10 |
|---|---|---|---|---|---|---|---|---|---|---|---|---|
| | Polyhydroxyalkanoate | Product name | PHA-2 | PHA-2 | PHA-2 | PHA-2 | | | | | | |
| | | parts | 40.0 | 40.0 | 40.0 | 40.0 | 0.0 | 0.0 | 0.0 | 0.0 | 0.0 | 0.0 |
| | (Meth)acrylate resin | Product name | N220-57-0.3 | N220-57-0.3 | N220-57-0.3 | N220-57-0.3 | N220-57-0.3 | N220-57-0.3 | N220-57-0.3 | N220-57-0.3 | N220-57-0.3 | N220-57-0.3 |
| | | parts | 1.0 | 1.0 | 1.0 | 1.0 | 1.0 | 1.0 | 1.0 | 1.0 | 1.0 | 1.0 |
| | Plasticizer | Product name | | PL012 | PL012 | PL012 | | PL012 | PL012 | PL012 | PL012 | PL012 |
| | | parts | 0.0 | 5.0 | 10.0 | 15.0 | 0.0 | 10.0 | 15.0 | 20.0 | 25.0 | 30.0 |
| Molding | Roll temperature | °C. | 170 | 165 | 165 | 160 | 170 | 165 | 165 | 165 | 165 | 160 |
| | Press temperature | °C. | 175 | 170 | 170 | 165 | 175 | 170 | 170 | 170 | 170 | 165 |
| Physical property | HAZE | % | 3.1 | 3.7 | 3.2 | 8.5 | 2.8 | 3.2 | 2.0 | 2.7 | 2.7 | 3.0 |
| | Tensile breaking stress | MPa | 27 | 18 | 12 | 9 | 31 | 26 | 32 | 29 | 21 | 19 |
| | Tensile break elongation | % | 312 | 347 | 336 | 315 | 32 | 53 | 164 | 206 | 235 | 287 |
| | Tensile elasticity | MPa | 735 | 171 | 10 | 7 | 1885 | 1647 | 1263 | 541 | 182 | 67 |
| | Plasticizer migration | Rank | 4 | 4 | 3 | 3 | 4 | 3 | 3 | 1 | 1 | 1 |
| Moldability | Air mark | Rank | Δ | Δ | Δ | Δ | Δ | Δ | Δ | Δ | Δ | Δ |
| | Flow mark | Rank | ○ | ○ | ○ | ○ | ○ | ○ | ○ | ○ | ○ | ○ |
| | Particle | Rank | ○ | ○ | ○ | ○ | ○ | ○ | ○ | ○ | ○ | ○ |

TABLE 5

| | Item | | Comparative Example 11 | Example 5 | Example 9 | Example 10 | Comparative Example 12 | Example 11 | Example 12 | Example 13 | Comparative Example 13 |
|---|---|---|---|---|---|---|---|---|---|---|---|
| Blending | Vinyl chloride resin | Product name | MB1008 | MB1008 | MB1008 | MB1008 | MB1008 | MB1008 | MB1008 | MB1008 | MB1008 |
| | | parts | 60.0 | 60.0 | 60.0 | 60.0 | 60.0 | 60.0 | 60.0 | 60.0 | 60.0 |
| | Polyhydroxyalkanoate | Product name | PHA-2 | PHA-2 | PHA-2 | PHA-2 | PHA-2 | PHA-2 | PHA-2 | PHA-2 | PHA-2 |
| | | parts | 40.0 | 40.0 | 40.0 | 40.0 | 40.0 | 40.0 | 40.0 | 40.0 | 40.0 |
| | (Meth)acrylate resin | Product name | | N220-57-0.3 | N220-57-0.3 | N220-57-0.3 | N220-57-0.3 | N100-57-0.3 | N100-57-0.3 | N100-57-0.3 | N100-57-0.3 |
| | | parts | 0.0 | 1.0 | 3.0 | 6.0 | 9.0 | 1.0 | 3.0 | 6.0 | 9.0 |
| | Plasticizer | Product name | | | | | | | | | |
| | | parts | 0.0 | 0.0 | 0.0 | 0.0 | 0.0 | 0.0 | 0.0 | 0.0 | 0.0 |
| Molding | Roll temperature | °C. | 170 | 170 | 170 | 170 | 170 | 170 | 170 | 170 | 170 |
| | Press temperature | °C. | 175 | 175 | 175 | 175 | 175 | 175 | 175 | 175 | 175 |
| Physical property | HAZE | % | 1.9 | 3.1 | 4.0 | 9.6 | | 2.9 | 11.9 | 40.0 | |
| | Tensile breaking stress | MPa | 31.8 | 27 | 29.6 | 19.7 | | 28.5 | 29.2 | 26.6 | |
| | Tensile break elongation | % | 297 | 312 | 282 | 152 | | 281 | 311 | 283 | |
| | Tensile elasticity | MPa | 854 | 735 | 781 | 853 | | 801 | 599 | 432 | |
| | Plasticizer migration | Rank | 4 | 4 | 4 | 4 | | 4 | 4 | 4 | |
| Moldability | Air mark | Rank | X | Δ | ◎ | ◎ | ◎ | Δ | ◎ | ◎ | ◎ |
| | Flow mark | Rank | ○ | ○ | ○ | Δ | X | ○ | ○ | Δ | X |
| | Particle | Rank | ○ | ○ | ○ | ○ | ○ | ○ | ○ | ○ | ○ |

TABLE 6

| | Item | | Example 14 | Example 15 | Example 16 | Comparative Example 14 | Comparative Example 15 | Comparative Example 16 | Comparative Example 17 | Comparative Example 18 |
|---|---|---|---|---|---|---|---|---|---|---|
| Blending | Vinyl chloride resin | Product name | MB1008 | MB1008 | MB1008 | MB1008 | MB1008 | MB1008 | MB1008 | MB1008 |
| | | parts | 60.0 | 60.0 | 60.0 | 60.0 | 60.0 | 60.0 | 60.0 | 60.0 |
| | Polyhydroxyalkanoate | Product name | PHA-2 | PHA-2 | PHA-2 | PHA-2 | PHA-2 | PHA-2 | PHA-2 | PHA-2 |
| | | parts | 40.0 | 40.0 | 40.0 | 40.0 | 40.0 | 40.0 | 40.0 | 40.0 |
| | (Meth)acrylate resin | Product name | N100-105-0.3 | N100-105-0.3 | N100-105-0.3 | N100-105-0.3 | N12-57-0.3 | N12-57-0.3 | K100-57-50 | K100-57-50 |
| | | parts | 1.0 | 3.0 | 6.0 | 9.0 | 3.0 | 6.0 | 3.0 | 6.0 |
| | Plasticizer | Product name | | | | | | | | |
| | | parts | 0.0 | 0.0 | 0.0 | 0.0 | 0.0 | 0.0 | 0.0 | 0.0 |
| Molding | Roll temperature | °C. | 170 | 170 | 170 | 170 | 170 | 170 | 170 | 170 |
| | Press temperature | °C. | 175 | 175 | 175 | 175 | 175 | 175 | 175 | 175 |
| Physical property | HAZE | % | 3.6 | 12.3 | 43.9 | | | | | |
| | Tensile breaking stress | MPa | 29.7 | 30.0 | 27.6 | | | | | |
| | Tensile break elongation | % | 268 | 302 | 271 | | | | | |
| | Tensile elasticity | MPa | 816 | 606 | 454 | | | | | |
| | Plasticizer migration | Rank | 4 | 4 | 4 | | | | | |
| Moldability | Air mark | Rank | Δ | ◎ | ◎ | ◎ | X | X | X | X |
| | Flow mark | Rank | ○ | ○ | Δ | X | ○ | ○ | ○ | ○ |
| | Particle | Rank | ○ | Δ | Δ | X | ○ | ○ | X | X |

TABLE 7

| | Item | | Comparative Example 19 | Example 17 | Example 18 | Comparative Example 20 | Comparative Example 21 | Example 19 | Example 20 | Example 21 | Comparative Example 22 |
|---|---|---|---|---|---|---|---|---|---|---|---|
| Blending | Vinyl chloride resin | Product name | MB1008 | MB1008 | MB1008 | MB1008 | MB1008 | MB1008 | MB1008 | MB1008 | MB1008 |
| | | parts | 50.0 | 50.0 | 50.0 | 50.0 | 60.0 | 60.0 | 60.0 | 60.0 | 60.0 |
| | Polyhydroxyalkanoate | Product name | PHA-2 | PHA-2 | PHA-2 | PHA-2 | PHA-2 | PHA-2 | PHA-2 | PHA-2 | PHA-2 |
| | | parts | 50.0 | 50.0 | 50.0 | 50.0 | 40.0 | 40.0 | 40.0 | 40.0 | 40.0 |
| | (Meth)acrylate resin | Product name | | N220-57-0.3 | N220-57-0.3 | N220-57-0.3 | | N220-57-0.3 | N220-57-0.3 | N220-57-0.3 | N220-57-0.3 |
| | | parts | 0.0 | 3.0 | 6.0 | 9.0 | 0.0 | 1.0 | 3.0 | 6.0 | 9.0 |
| | Plasticizer | Product name | | | | | PL012 | PL012 | PL012 | PL012 | PL012 |
| | | parts | 0.0 | 0.0 | 0.0 | 0.0 | 10.0 | 10.0 | 10.0 | 10.0 | 10.0 |
| Molding | Roll temperature | °C. | 165 | 165 | 165 | 165 | 160 | 160 | 160 | 160 | 160 |
| | Press temperature | °C. | 170 | 170 | 170 | 170 | 165 | 165 | 165 | 165 | 165 |
| Physical property | HAZE | % | | 10.0 | 24.6 | | 2.8 | 2.8 | 4.7 | 6.9 | 11.7 |
| | Tensile breaking stress | MPa | | 20.3 | 23.0 | | 9.7 | 10.6 | 11.9 | 11.9 | 12.3 |
| | Tensile break elongation | % | | 369 | 403 | | 339 | 309 | 322 | 294 | 297 |
| | Tensile elasticity | MPa | | 225 | 180 | | 8 | 17 | 24 | 24 | 49 |
| | Plasticizer migration | Rank | | 4 | 4 | | | 4 | 4 | 4 | |
| Moldability | Air mark | Rank | X | Δ | ◎ | ◎ | X | Δ | ◎ | ◎ | ◎ |
| | Flow mark | Rank | ○ | ○ | ○ | X | ○ | ○ | ○ | ○ | X |
| | Particle | Rank | ○ | ○ | ○ | ○ | ○ | ○ | ○ | ○ | ○ |

TABLE 8

| | Item | | Example 22 | Example 4 | Example 23 | Example 24 | Example 5 | Example 25 | Example 26 | Example 27 |
|---|---|---|---|---|---|---|---|---|---|---|
| Blending | Vinyl chloride resin | Product name | MB1008 | MB1008 | MB1008 | MB1008 | MB1008 | MB1008 | MB1008 | MB1008 |
| | | parts | 50.0 | 50.0 | 50.0 | 50.0 | 60.0 | 60.0 | 60.0 | 60.0 |
| | Polyhydroxyalkanoate | Product name | PHA-1 | PHA-2 | PHA-3 | PHA-4 | PHA-2 | PHA-5 | PHA-6 | PHA-7 |
| | | parts | 50.0 | 50.0 | 50.0 | 50.0 | 40.0 | 40.0 | 40.0 | 40.0 |
| | (Meth)acrylate resin | Product name | N220-57-0.3 | N220-57-0.3 | N220-57-0.3 | N220-57-0.3 | N220-57-0.3 | N220-57-0.3 | N220-57-0.3 | N220-57-0.3 |
| | | parts | 1.0 | 1.0 | 1.0 | 1.0 | 1.0 | 1.0 | 1.0 | 1.0 |
| | Plasticizer | Product name | | | | | | | | |
| | | parts | 0.0 | 0.0 | 0.0 | 0.0 | 0.0 | 0.0 | 0.0 | 0.0 |
| Molding | Roll temperature | °C. | 170 | 170 | 170 | 170 | 170 | 170 | 170 | 170 |
| | Press temperature | °C. | 175 | 175 | 175 | 175 | 175 | 175 | 175 | 175 |
| Physical property | HAZE | % | 2.3 | 3.2 | 14.3 | 40.2 | 3.1 | 54.2 | 42.5 | 18.3 |
| | Tensile breaking stress | MPa | 28 | 28 | 24 | 22 | 27 | 24 | 29 | 27 |
| | Tensile break elongation | % | 425 | 324 | 376 | 347 | 312 | 182 | 337 | 336 |
| | Tensile elasticity | MPa | 103 | 259 | 378 | 232 | 735 | 834 | 509 | 361 |
| | Plasticizer migration | Rank | 4 | 4 | 4 | 4 | 4 | 4 | 4 | 4 |
| Moldability | Air mark | Rank | Δ | Δ | Δ | Δ | | | | |
| | Flow mark | Rank | ○ | ○ | ○ | ○ | | | | |
| | Particle | Rank | ○ | ○ | ○ | ○ | | | | |

TABLE 9

| | Item | | Example 5 | Example 28 | Example 29 | Example 30 | Comparative Example 23 | Example 28 | Example 31 | Example 5 | Example 32 |
|---|---|---|---|---|---|---|---|---|---|---|---|
| Blending | Vinyl chloride resin | Product name | MB1008 | S1008 | S1001 | S1003 | KS2500 | S1008 | S1008 | MB1008 | MB1008 |
| | | parts | 60.0 | 60.0 | 60.0 | 60.0 | 60.0 | 60.0 | 60.0 | 60.0 | 60.0 |
| | Polyhydroxyalkanoate | Product name | PHA-2 | PHA-2 | PHA-2 | PHA-2 | PHA-2 | PHA-2 | PHA-2 | PHA-2 | PHA-2 |
| | | parts | 40.0 | 40.0 | 40.0 | 40.0 | 40.0 | 40.0 | 40.0 | 40.0 | 40.0 |
| | (Meth)acrylate resin | Product name | N220-57-0.3 | N220-57-0.3 | N220-57-0.3 | N220-57-0.3 | N220-57-0.3 | N220-57-0.3 | N220-57-0.3 | N220-57-0.3 | N220-57-0.3 |
| | | parts | 1.0 | 1.0 | 1.0 | 1.0 | 1.0 | 1.0 | 1.0 | 1.0 | 1.0 |
| | Plasticizer | Product name | | | | | | | | | |
| | | parts | 0.0 | 0.0 | 0.0 | 0.0 | 0.0 | 0.0 | 0.0 | 0.0 | 0.0 |
| Molding | Roll temperature | °C. | 170 | 180 | 190 | 195 | 200 | 180 | 180 | 170 | 170 |
| | Press temperature | °C. | 175 | 185 | 195 | 200 | 205 | 185 | 185 | 175 | 175 |
| Physical property | HAZE | % | 3.1 | 12.2 | 98.8 | 99.9 | * | 12.2 | 97.2 | 3.1 | 3.8 |
| | Tensile breaking stress | MPa | 27 | 27.0 | 29.6 | 32.2 | | 27.0 | 35.5 | 27 | 28 |
| | Tensile break elongation | % | 312 | 301 | 308 | 130 | | 301 | 243 | 312 | 286 |
| | Tensile elasticity | MPa | 735 | 762 | 928 | 989 | | 762 | 867 | 735 | 751 |
| | Plasticizer migration | Rank | 4 | 4 | 4 | 4 | | 4 | 4 | 4 | 4 |
| Moldability | Air mark | Rank | | | | | | | | | |
| | Flow mark | Rank | | | | | | | | | |
| | Particle | Rank | | | | | | | | | |

* Molding impossible: The vinyl chloride resin did not gel.

TABLE 10

| | Item | | | Example 33 | Example 34 | Example 35 | Example 36 | Example 37 | Example 38 | Example 39 | Example 40 |
|---|---|---|---|---|---|---|---|---|---|---|---|
| Blending (Compound) | First stage | Vinyl chloride resin | Product name | S1001 | S1001 | S1001 | S1001 | S1001 | S1003 | S1008 | MB1008 |
| | | | parts | 60.0 | 60.0 | 60.0 | 60.0 | 60.0 | 60.0 | 60.0 | 60.0 |
| | | Polyhydroxyalkanoate | Product name | PHA-2 | PHA-2 | PHA-2 | PHA-2 | | PHA-2 | PHA-2 | PHA-2 |
| | | | parts | 40.0 | 25.7 | 15.0 | 6.7 | 0.0 | 15.0 | 15.0 | 15.0 |
| | | (Meth)acrylate resin | Product name | N220-57-0.3 | N220-57-0.3 | N220-57-0.3 | N220-57-0.3 | N220-57-0.3 | N220-57-0.3 | N220-57-0.3 | N220-57-0.3 |
| | | | parts | 3.0 | 3.0 | 3.0 | 3.0 | 3.0 | 3.0 | 3.0 | 3.0 |
| | | Plasticizer | Product name | | | | | | | | |
| | | | parts | 0.0 | 0.0 | 0.0 | 0.0 | 0.0 | 0.0 | 0.0 | 0.0 |
| | Second Stage | Polyhydroxyalkanoate | Product name | PHA-2 | PHA-2 | PHA-2 | PHA-2 | PHA-2 | PHA-2 | PHA-2 | PHA-2 |
| | | | parts | 0.0 | 14.3 | 25 | 33.3 | 40.0 | 25.0 | 25.0 | 25.0 |
| Molding | Roll temperature | | °C. | 175 | 175 | 175 | 175 | 175 | 185 | 170 | 165 |
| | Press temperature | | °C. | 180 | 180 | 180 | 180 | 180 | 190 | 175 | 170 |
| Physical property | Transparency | | Rank | X | Δ | ○ | ○ | X | X | ○ | ○ |
| | Tensile breaking stress | | MPa | 28.2 | 27.1 | 27.6 | 27.3 | 28.6 | 29.1 | 26.9 | 26.7 |
| | Tensile break elongation | | % | 248 | 295 | 287 | 302 | 254 | 221 | 309 | 301 |
| | Tensile elasticity | | MPa | 852 | 721 | 715 | 734 | 868 | 891 | 736 | 729 |
| | Plasticizer migration | | Rank | 4 | 4 | 4 | 4 | 4 | 4 | 4 | 4 |
| Moldability | Transportability of melted resin | | Rank | ◎ | ○ | ○ | ○ | ◎ | ◎ | Δ | Δ |
| | Adhesion to roll | | Rank | ◎ | ○ | ○ | ○ | ◎ | ◎ | ○ | Δ |
| | Air mark | | Rank | X | ○ | ○ | ○ | X | X | ○ | ○ |
| | Flow mark | | Rank | ○ | ○ | ○ | ○ | ○ | ○ | ○ | ○ |
| | Particle | | Rank | ○ | ○ | ○ | ○ | ○ | ○ | ○ | ○ |

The invention claimed is:

1. A soft thermoplastic resin composition comprising:
100 parts by weight of a resin component (A) comprising from 15 to 65 parts by weight of a vinyl chloride resin having a degree of polymerization of 2000 or less, and from 35 to 85 parts by weight of a polyhydroxyalkanoate; and
from 0.1 to 8 parts by weight of a resin component (B) which is one or more resins selected from the group consisting of a (meth)acrylate resin and an acrylonitrile-styrene resin, and has a weight average molecular weight, in terms of polystyrene, of 400,000 or more,
wherein the polyhydroxyalkanoate is copolymer comprising monomer units derived from 3-hydroxybutyrate and monomer units derived from hydroxyalkanoate other than 3-hydroxybutyrate, and
the hydroxyalkanoate other than the 3-hydroxybutyrate is at least one member selected from the group consisting of 4-hydroxybutyrate, 3-hydroxyvalerate, 3-hydroxyhexanoate, 3-hydroxyoctanoate, and 3-hydroxydecanoate.

2. The soft thermoplastic resin composition according to claim 1, wherein the copolymer contains 50 to 95% by mole of monomer units derived from the 3-hydroxybutyrate.

3. The soft thermoplastic resin composition according to claim 1, wherein the resin component (B) has a number average primary particle size of 40 μm or less.

4. The soft thermoplastic resin composition according to claim 1, wherein a molded article therefrom having a thickness of 1 mm has an HAZE of 50% or less.

5. A molded article comprising the soft thermoplastic resin composition according to claim 1.

6. A film or sheet comprising the molded article according to claim 5.

* * * * *

UNITED STATES PATENT AND TRADEMARK OFFICE
CERTIFICATE OF CORRECTION

Page 1 of 1

PATENT NO.         : 9,574,082 B2
APPLICATION NO.    : 14/910162
DATED              : *February 21, 2017
INVENTOR(S)        : Yoshiaki Matsuoka It is certified that error appears in the above-identified patent and that said Letters Patent is hereby corrected as shown below:

On the Title Page

The Terminal Disclaimer information has been omitted. Item (45) and the Notice information should read as follows:

-- (45) **Date of Patent: *Feb. 21, 2017**

(*) Notice: Subject to any disclaimer, the term of this patent is extended or adjusted under 35 U.S.C. 154(b) by 0 days.

This patent is subject to a terminal disclaimer. --

Signed and Sealed this
Twenty-sixth Day of June, 2018

Andrei Iancu
*Director of the United States Patent and Trademark Office*